(12) United States Patent
Polido

(10) Patent No.: US 11,279,035 B1
(45) Date of Patent: Mar. 22, 2022

(54) LIDAR SAFELY RINGS

(71) Applicant: Amazon Technologies, Inc., Seattle, WA (US)

(72) Inventor: Felipe De Arruda Camargo Polido, North Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 292 days.

(21) Appl. No.: 16/421,402

(22) Filed: May 23, 2019

(51) Int. Cl.
*B25J 9/16* (2006.01)
*G01S 17/93* (2020.01)

(52) U.S. Cl.
CPC ............. *B25J 9/1676* (2013.01); *G01S 17/93* (2013.01)

(58) Field of Classification Search
CPC ................................ B25J 9/1676; G01S 17/93
See application file for complete search history.

(56) References Cited

U.S. PATENT DOCUMENTS

| | | | |
|---|---|---|---|
| 6,246,468 B1* | 6/2001 | Dimsdale ............. | G01B 11/002 356/4.02 |
| 9,074,878 B2* | 7/2015 | Steffey .................. | G01C 15/002 |
| 9,594,381 B1* | 3/2017 | Clark ..................... | G01S 7/4813 |
| 9,989,623 B2* | 6/2018 | Send ......................... | G01C 3/32 |
| 10,222,474 B1* | 3/2019 | Raring .................... | F21V 29/70 |
| 10,948,567 B2* | 3/2021 | Eberspach .............. | G01S 17/46 |
| 2017/0001311 A1* | 1/2017 | Bushman ............... | A47L 9/2826 |
| 2017/0090481 A1* | 3/2017 | Clark ....................... | E04H 15/50 |
| 2018/0059248 A1* | 3/2018 | O'Keeffe .............. | G01S 17/931 |
| 2018/0149753 A1* | 5/2018 | Shin ........................ | G01S 17/42 |
| 2019/0120938 A1* | 4/2019 | Shim .................. | G02B 13/0005 |
| 2019/0154439 A1* | 5/2019 | Binder .................... | G01S 15/08 |
| 2019/0204423 A1* | 7/2019 | O'Keeffe .............. | G01S 7/4817 |
| 2019/0339356 A1* | 11/2019 | Schildknecht ........ | G01S 7/4814 |
| 2019/0353767 A1* | 11/2019 | Eberspach ............. | G01S 17/89 |
| 2020/0183006 A1* | 6/2020 | Eberspach ............ | G01J 1/4228 |

OTHER PUBLICATIONS

Gati et al, City Alien, 2010, The City College of New York, New York, US.

* cited by examiner

*Primary Examiner* — Bhavesh V Amin
(74) *Attorney, Agent, or Firm* — Eversheds Sutherland (US) LLP

(57) ABSTRACT

Systems, devices, and methods are provided for using Light Detection and Ranging (LIDAR) safety rings. An robotic apparatus may include a moveable component having a longitudinal central axis spanning between a first end and a second end, a transceiver positioned at the first end of the moveable component to emit and receive light, and a reflective surface at the first end of the moveable component. The reflective surface may reflect light signals emitted by the transceiver toward the second end, and may reflect returning light signals toward the transceiver. The robotic apparatus may include at least one processor to determine, based on the returning light signals, that an object is within a distance of the moveable component, and to change an operation of the robotic apparatus based on the object.

20 Claims, 11 Drawing Sheets

LIDAR SAFELY RINGS

BACKGROUND

Automated machines increasingly are being used in various applications, including crowded environments with many objects or people, such as in manufacturing environments. Such automated machines may move quickly and may exert significant force, which may pose a safety risk for nearby people or objects. Some attempts to detect objects near an automated machine may lack accuracy and the ability to customize a solution for different types of machines and environments, may prevent automated machines from operating efficiently, and may limit the applications in which an automated machine may be used.

Figure 1A:
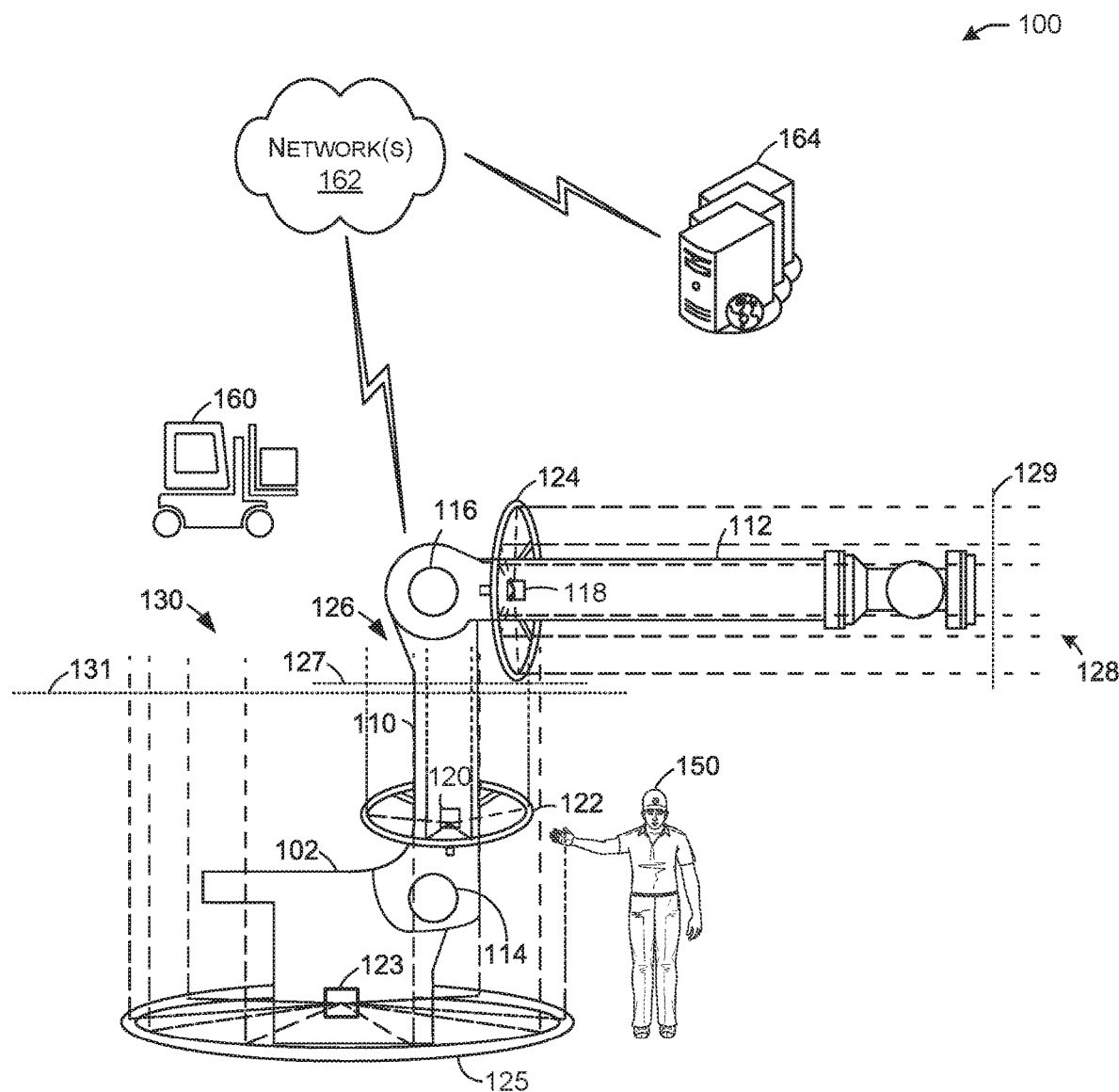
FIG. 1A illustrates an example system for Light Detection and Ranging (LIDAR) safety rings, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for Light Detection and Ranging (LIDAR) safety rings.

In many operations, robots and other automated devices may act with little or no human control. In some operating environments (e.g., environments using hydraulic or other high-powered machines), safety may be a concern when a robot is operating due to operational speed and force of a robot or other automated device. For example, safety may be improved by avoiding collisions or other contact with an operational robot. Some ways of improving robot operation safety may cause a robot to change or stop operations when humans or objects are within a given distance of a robot. For example, pressure from touching a robot may cause the robot to stop operating or change operations. Some examples of robot safety controls may use sensors external to a robot to detect force as a robot nears a person or object. Other examples of robot safety controls may include estimating the force on a robot, and using sensors to detect if any force additional to an expected force is present on a robot.

One drawback of some methods of robot safety controls may be related to sensitivity to a robot's operating speed. For example, if a robot with a large mass moves at one meter per second, the velocity of the robot may cause a significant exertion of force. Therefore, robots with larger mass may need to operate at slower speeds to account for the significant force caused by robot movement. For example, a robot with large mass being limited to a slower operating speed of 150 millimeters per second may not be suitable for some operations, such as production operations for fulfillment centers.

One way to address robot safety and velocity limitations of operating robots may include using cameras in a workspace (e.g., a three-dimensional camera capturing the operation of a robot). However, achieving the level of accuracy needed for robot operation safety may be difficult using such a solution, and adapting such use of cameras to different types of robots and working environments may be prohibitive.

Light Detection and Ranging (LIDAR) offers solutions for robot operation safety by facilitating object detection. LIDAR relies on light signals (e.g., laser signals) to measure ranges to an object or surface. A LIDAR system may include a laser (e.g., infrared), a scanner, and a receiver or sensor. The laser sends light signals which hit objects or surfaces, and the light is reflected from the objects or surfaces and detected by the receiver or sensor. LIDAR systems may determine distance to an object or surface by measuring the time between transmitted pulses and received pulses (e.g., using the speed of sound constant). LIDAR systems may provide three-dimensional image analysis to detect the presence of nearby objects and surfaces.

In robot operations, LIDAR systems may provide floor sensing and/or wall sensing. For example, LIDAR systems may sense an operational area, and a door may be left open and fitted with a laser scanner. Alternatively, LIDAR systems may use a horizontal laser scanner with a long enough distance to cover an operating area so that, for example, if a person runs into the operational area, a robot may stop operating before risking any contact with the person. Such solutions, however, may require a significantly large workspace to monitor with LIDAR, and therefore may require significant resources.

Therefore, robot operational safety control may be improved by using LIDAR safety rings to reduce the resources needed to monitor a robot's environment and to improve object or surface detection accuracy.

In one or more embodiments, LIDAR scanners may be used to generate a force field (or zone) around a robot and to detect when any objects or surfaces breach the force field. When an object or surface comes within the force field (e.g., within a threshold distance of a robot), the robot may change or stop operations. The force field may consist of LIDAR safety rings around components of a robot. For example, the force field around a robot arm may be cylindrical in nature (e.g., a series of LIDAR rings representing cross-sections of the force field). By generating a number of LIDAR safety rings, a LIDAR system may generate a force field around a robot, and may use LIDAR to detect when an object or surface is within the force field (e.g., is too close to the robot to ensure operational safety). Because the force field may be created using LIDAR light signals, a robot may be able to operate at higher speeds than robots which rely on force (e.g., touch) detection for object or surface proximity. The field or zone may be an area surrounded by an optical fence (e.g., the area of a cylinder surrounded by a fence representing the outer perimeter of the cylinder, the fence created by optical signals).

In one or more embodiments, to create LIDAR safety rings, sensors may emit or otherwise transmit signals, such as optical signals in outward directions from a robot or machine. Reflective surfaces, such as mirrors, may be arranged around the robot (entirely or in part) to reflect the outwardly transmitted signals from the sensors. For example, a reflective surface (which may refer to one reflective surface or a combination of surfaces able to reflect light or other signals) may form a ring around all or a portion of a robot. The reflective surface may be concave, convex, or otherwise shaped to reflect signals sent from the sensors at different angles to create a surrounding force field or zone around at least a portion of the robot. For example, a reflective surface in a toroidal shape attached to or otherwise arranged around the robot may reflect the signals transmitted at different angles in a manner that creates a field or zone around the machine. The field may take a shape dependent on the shape and arrangement of the reflective surface relative to the machine and/or sensors. For example, the field may be elliptical, cylindrical, conical, polygonal, or another shape which at least partially engulfs all or a portion of the robot. The field may represent a series of LIDAR rings (or other shapes surrounding the robot) which, when crossed by an object or person, may result in an operational change of the robot in order to avoid a collision.

In one or more embodiments, any portion of a robot may use one or more sensors and one or more reflective surfaces to create a field or zone using LIDAR. For example, if a robot has multiple moveable components (e.g., moveable arms), any of the arms may attach to or otherwise be arranged relative to sensors which may transmit and receive signals, such as optical light signals. The robot components may each generate their own respective fields or zones using LIDAR based on the arrangement of the sensors and reflective surfaces. Any zone for one robot component may be the same shape or size as the zone for another component of the same robot, or respective zones of a robot may have different shapes and sizes.

In one or more embodiments, LIDAR sensors used to transmit light signals for the creation of a field or zone around a robot may be configured to transmit the light signals at different angles. The sensors may be arranged at or near a connecting joint of two or more components. In this manner, one light signal may reflect off of a reflective light surface at a different location and angle than another light signal transmitted at a different angle. When the respective light signals reflect off of an object or person, the light signals may reflect back to the reflective surface, and from the reflective surface back to the sensors. The robot may use the returning light signal (e.g., the light signal reflected back to the sensor after being transmitted toward the reflective surface from the sensor) to determine the distance from which the returning light signal was reflected (e.g., a distance to an object, surface, or person from which the light signal was reflected). Given the angle at which a respective light signal is transmitted, the robot may be programmed with a corresponding distance to a reflective surface and with the distance corresponding to a boundary of the force field or zone. Knowing the total distance that a light signal transmitted at a given angle is to travel to reach the boundary of the field or zone (e.g., based on the sum of the distance from the sensor to the reflective surface and the distance from the reflective surface to the boundary of the zone or field), the robot may determine a threshold transmission time (e.g., time of flight) between transmission of a signal and reception of the return signal. The threshold transmission time or time of flight may correspond to a time after which the signal reflecting off of a person, object, or surface is indicative that the person, object, or surface is outside the boundary of the field or zone. When the time of flight is less than a threshold time, such may indicate that the transmitted light signal reflected off of a person, object, or surface within the boundary of the field or zone.

In one or more embodiments, a threshold time of flight for any light signal may correspond to the distance that the light signal may travel before colliding with a person, object, or surface. The light signal may travel a distance from a LIDAR sensor to reflective surface, from the reflective surface to an object, person, or surface, and may travel the same distances in return back to the reflective surface and back to the LIDAR sensor. Because the velocity of the light signal may be known by the LIDAR sensor or other device, the LIDAR sensor or other device may determine the threshold time of flight allowed before the light signal should collide with a person, object, or surface. The threshold distance may correspond to the field or zone around the machine component, and may account for the kinematic state (e.g., position, velocity, angular velocity, etc.) of the machine component, the location of the machine component relative to any other known objects (e.g., another machine component, objects whose locations are known to the LIDAR sensor or other device, etc.). At a given kinematic state, a light signal emitted at a particular angle may correspond to a known distance to reach the reflective surface, and to a known distance corresponding to a boundary of the field or zone (e.g., a distance based on how fast the machine component is moving, a distance based on known locations of other machine components or objects, etc.). Based on the known distance threshold corresponding to how far a light signal emitted at a given angle is allowed to travel before reflecting off of a person, object, or surface, the LIDAR sensor or other device may determine a corresponding time of flight threshold and may compare the actual time of flight of a received reflected signal to the time of flight threshold to determine whether the time of flight was too short (e.g., the light signal reflected off of something before reaching the boundary of the zone or field) or was sufficiently long to satisfy the threshold time and distance.

In one or more embodiments, the robot may determine, for any respectively transmitted light signal, whether the corresponding returning light signal indicates that an object, surface, or person is within the corresponding distance threshold for the light signal given the angle at which the light signal was transmitted. When the returning light signal indicates that an object, surface, or person is at a distance within the threshold distance, the robot may determine that the object, surface, or person is within the field or zone around the robot (e.g., is too proximal), and may alter the robot's operation (e.g., by slowing down or stopping all or a portion of the robot's movement). Based on the robot's operational speed or force, and based on the LIDAR-determined distance to an object, surface, or person, the robot may determine a time or rate at which to slow down or stop in order to avoid a collision with the object, surface, or person. When the returning light signal indicates that an object, surface, or person is at a distance exceeding the corresponding distance threshold, the robot may determine that there are no objects, surfaces, or people proximal enough to pose an operational safety risk, and the robot may continue its operations.

In one or more embodiments, the robot may use deceleration profiles to determine when to slow down movement and at what rates and times. For example, given a LIDAR-detected distance between the robot and a person, object, or surface, the robot may identify a deceleration profile based on the kinematic state of the robot. For example, given the type or speed of movement of the robot and the distance to a person, object, or surface, the robot may select a deceleration profile which may govern the rate at which the robot may decelerate given the amount of time the robot has before colliding with or coming within a threshold distance of the person, object, or surface.

In one or more embodiments, the LIDAR safety rings may be applied to other uses cases other than moving robots. For example, other moving machines such as automobiles, bicycles, and scooters may use LIDAR safety rings to create fields or zones used to detect the encroachment of a person, object, or surface to avoid collisions. LIDAR safety rings also may be applied in security or monitoring settings, such as by creating LIDAR safety rings around an object (e.g., a valuable product or artifact) or exhibit (e.g., a painting, sculpture, etc.). LIDAR safety rings may be used to identify when a person or object comes within a given distance of a stationary or moving object.

In one or more embodiments, LIDAR safety rings may be used to create multiple zones or fields which may overlap. In the context of robots and moving machines with multiple components, for example, a robot or machine may have multiple moving components which may each use LIDAR safety rings to create respective zones or fields around the moving components to identify when a respective component may be at risk of collision with a person, object, or surface. When connected components each use LIDAR safety rings, the respective zones or fields around the components may overlap. In such cases, the robot or machine may be configured to recognize the overlap of fields so that such overlapping is not interpreted as a person, object, or surface entering the field or zone.

In one or more embodiments, light signals may be emitted at different frequencies so that a LIDAR device may identify the returning light signal and determine the corresponding time and/or distance thresholds with which to determine whether an object is too close to a robotic or other machine component. For any light signals emitted at the same frequency, the light signals may include an indication of the angle at which they were emitted so that that a device may identify the returning light signal and determine the corresponding time and/or distance thresholds with which to determine whether an object is too close to a robotic or other machine component.

The embodiments described herein may provide multiple benefits, such as collision avoidance, security monitoring, increased accuracy of proximity detection, customization for different uses, and reduced resources when compared to some other methods of object detection. By leveraging two-dimensional LIDAR technology, the embodiments described herein may generate three-dimensional fields around objects to monitor the proximity of other objects or people.

In the present disclosure, while terms such as LIDAR and light/optical signals may be used, the sensors may use other technologies than LIDAR. For example, the sensors or LIDAR devices may refer to radar or other electromagnetic transmissions, including sonar (e.g., using a sound reflecting surface), infrared, or other signals. LIDAR devices or sensors referred to herein may refer to a ranging sensor or transceiver capable of emitting, broadcasting, or otherwise sending signals, pulses, waves, etc.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1A illustrates an example system 100 for LIDAR safety rings, in accordance with one or more example embodiments of the present disclosure.

Referring to FIG. 1A, the system 100 may include multiple components, such as component 102, component 110, and component 112, which may form a robot (e.g., a robotic apparatus) or another type of machine. The component 110 may operatively connect to the component 102 at a connection point 114, which may include any type of joint, hinge, or other connection mechanism which may allow the component 110 to move while remaining operatively connected to the component 102, and which may be controlled with a motor whose operation is based on a movement profile that may define the relative positions, velocity, and/or rotation of any portion of the component 102 and/or the component 110. The component 112 may operatively connect to the component 110 at a connection point 116, which may include any type of joint, hinge, or other connection mechanism which may allow the component 112 to move while remaining operatively connected to the component 110, and which may be controlled with a motor whose operation is based on a movement profile that may define the relative positions, velocity, and/or rotation of any portion of the component 112 and/or the component 110.

Still referring to FIG. 1A, the system 100 may include a sensor 118, a sensor 120, a reflective surface 122, a sensor 123, a reflective surface 124, and a reflective surface 125.

The sensor 118 and the reflective surface 124 may be mounted to or otherwise operatively connected to the component 112. The sensor 120 and the reflective surface 122 may be mounted to or otherwise operative connected to the component 110. The sensor 120 and the reflective surface 122 may be used by the system 100 to create a field 126 (e.g., a safety field or zone) partially or completely surrounding the component 110 (e.g., surrounding a longitudinal central axis spanning between the respective ends of the component 110). The field 126 shown in FIG. 1A is cylindrical and formed by emitted signals (the dotted lines) transmitted by the sensor 120 and reflecting off of the reflective surface 122 in a direction toward the top of the page. The sensor 118 and the reflective surface 124 may be used by the system 100 to create a field 128 (e.g., a safety field or zone) partially or completely surrounding the component 112 (e.g., surrounding a longitudinal central axis spanning between the respective ends of the component 112). The field 128 shown in FIG. 1A is cylindrical and formed by emitted signals (the dotted lines) transmitted by the sensor 118 and reflecting off of the reflective surface 124 in a direction toward the right side of the page. The system 100 may determine whether any people, objects, or surfaces (e.g., the person 150 or the machine 160) are within the field 126 or the field 128 at a given time based on the use of the sensor 118 and/or the sensor 120 as explained further below. While the field 126 and the field 128 are shown to be the same shape, they may be different shapes based on the type and/or arrangement of the reflective surface 122 and the reflective surface 124.

Still referring to FIG. 1A, the component 102 may be operatively connected to a sensor 123 and a reflective surface 125 similar to the manner explained above with respect to the component 110. The dotted lines shown in the form of a cylinder may represent a field 130 surrounding the component 102, as the dotted lines may be transmitted light signals from the sensor 123 and reflected off of the reflective surface 125 in a direction toward the top of the page.

In one or more embodiments, the sensor 118, the sensor 120, and the sensor 123 each may be ranging sensors or other types of sensors or transceivers, and may include one or more emitters and sensors which may receive emitted signals. For example, the sensor 118, the sensor 120, and the sensor 123 may include optical signal emitters and LIDAR scanners. The sensor 118 may emit light signals at different angles in the direction of the reflective surface 124, which may reflect the emitted signals in different directions. The reflective surface 124 may surround the component 112 (e.g., in a toroidal shape), and may be mounted to or otherwise operative connected to the component 112. The signals emitted or otherwise transmitted by the sensor 118 may be reflected off of the reflective surface 124, and may reflect off of people, objects, or surfaces. When an emitted signal from the sensor 118 reflects off of a person, object, or surface, a return signal is reflected back to the reflective surface 124, which may reflect the return signals back to the sensor 118. The signals emitted from the sensor 118 (or other not shown sensors operatively connected to the component 112) may reflect off of the reflective surface 124 to create the field 128.

In one or more embodiments, the sensor 120 may emit light signals at different angles in the direction of the reflective surface 122, which may reflect the emitted signals in different directions. The reflective surface 122 may surround the component 110 (e.g., in a toroidal shape), and may be mounted to or otherwise operative connected to the component 110. The signals emitted or otherwise transmitted by the sensor 120 may be reflected off of the reflective surface 122, and may reflect off of people, objects, or surfaces. When an emitted signal from the sensor 120 reflects off of a person, object, or surface, a return signal is reflected back to the reflective surface 122, which may reflect the return signals back to the sensor 120. The signals emitted from the sensor 120 (or other not shown sensors operatively connected to the component 110) may reflect off of the reflective surface 122 to create the field 126.

In one or more embodiments, the sensor 123 may emit light signals at different angles in the direction of the reflective surface 125, which may reflect the emitted signals in different directions. The reflective surface 125 may surround the component 102 (e.g., in a toroidal shape), and may be mounted to or otherwise operative connected to the component 102. The signals emitted or otherwise transmitted by the sensor 123 may be reflected off of the reflective surface 125, and may reflect off of people, objects, or surfaces. When an emitted signal from the sensor 123 reflects off of a person, object, or surface, a return signal is reflected back to the reflective surface 125, which may reflect the return signals back to the sensor 123. The signals emitted from the sensor 123 (or other not shown sensors operatively connected to the component 102) may reflect off of the reflective surface 125 to create the field 130.

In one or more embodiments, when an object or surface (e.g., the person 150 or the machine 160) comes within the field 126, the field 128, or the field 130 (e.g., within a threshold distance 127 of a component 110, a threshold distance 129 of the component 112, or a threshold distance 131 of the component 102), the component 110, the component 112, and/or the component 102 may change or stop operations. The field 126, the field 128, and the field 130 may include LIDAR safety rings around the component 110, the component 112, and the component 102, respectively. The field 126, the field 128, and the field 130 may be cylindrical in nature (e.g., a series of LIDAR rings representing cross-sections of the fields). The threshold distance may be based on a kinematic state of any component. The kinematic state of any component may refer to a movement profile which may define the position of a component, a velocity of a component, an acceleration of a component, a type and direction of movement, etc. Based on the kinematic state of a component, the distance to any other component may be determined. For example, a kinematic state of the component 110 may correspond to a kinematic state of the component 112. Based on the known distance between any components or between a component and/or any object whose position is known, the threshold distance may be determined. Based on the threshold distance from any component, a threshold time of flight for respective light signals may be determined and used to identify when a person, object, or surface is within a distance threshold as explained further below. The size of a reflective surface may be based on the movement profile of a component (e.g., a faster, heavier component may use a larger reflective surface to create a larger field around the component).

In one or more embodiments, the sensor 118 may be arranged at or near a connecting joint (e.g., the connection point 116) of two or more components (e.g., the component 110 and the component 112). In this manner, one light signal may reflect off of the reflective surface 124 at a different location and angle than another light signal transmitted at a different angle. When the respective light signals reflect off of an object or person, the light signals may reflect back to the reflective surface 124, and from the reflective surface back to the sensor 118. The system 100 may use the time between transmission of the light signal and receipt of the returning light signal (e.g., the light signal reflected back to the sensor after being transmitted toward the reflective surface from the sensor) to determine the distance from which the returning light signal was reflected (e.g., a distance to an object, surface, or person from which the light signal was reflected). When the time between transmission of the light signal and receipt of the returning light signal indicates (e.g., given a known speed of the signal, such as the speed of light) indicates that the distance is outside the boundary of the field 128, such may be indicative of no person, object, or surface within the field 128. When the time between transmission of the light signal and receipt of the returning light signal indicates that the distance is within the boundary of the field 128, such may be indicative that a person, object, or surface is within the field 128 (e.g., within a threshold distance). The system 100 may determine a threshold time of flight based on the threshold distance, and may determine whether the actual time of flight for any light signal fails to exceed the threshold time of flight (e.g., because the light signal reflected back too quickly, indicating that something may have crossed into the field 128).

In one or more embodiments, the sensor 120 may be arranged at or near a connecting joint (e.g., the connection point 114 of two or more components (e.g., the component 102 and the component 110). In this manner, one light signal may reflect off of the reflective surface 122 at a different location and angle than another light signal transmitted at a different angle. When the respective light signals reflect off of an object or person, the light signals may reflect back to the reflective surface 122, and from the reflective surface back to the sensor 120. The system 100 may use the returning light signal (e.g., the light signal reflected back to the sensor after being transmitted toward the reflective surface from the sensor) to determine the distance from which the returning light signal was reflected (e.g., a distance to an object, surface, or person from which the light signal was reflected). The system 100 may use the time between transmission of the light signal and receipt of the returning light signal (e.g., the light signal reflected back to the sensor after being transmitted toward the reflective surface from the sensor) to determine the distance from which the returning light signal was reflected (e.g., a distance to an object, surface, or person from which the light signal was reflected). When the time between transmission of the light signal and receipt of the returning light signal indicates (e.g., given a known speed of the signal, such as the speed of light) indicates that the distance is outside the boundary of the field 126, such may be indicative of no person, object, or surface within the field 126. When the time between transmission of the light signal and receipt of the returning light signal indicates that the distance is within the boundary of the field 126, such may be indicative that a person, object, or surface is within the field 126 (e.g., within a threshold distance). The system 100 may determine a threshold time of flight based on the threshold distance, and may determine whether the actual time of flight for any light signal fails to exceed the threshold time of flight (e.g., because the light signal reflected back too quickly, indicating that something may have crossed into the field 126).

In one or more embodiments, the system 100 may determine, for any respectively transmitted light signal, whether the corresponding returning light signal indicates that an object, surface, or person is within the corresponding distance threshold (e.g., field boundary) for the light signal given the angle at which the light signal was transmitted, the corresponding distance to a reflective surface (e.g., as explained further below with respect to FIG. 1B), the time of flight between transmission and reception, and the speed of the transmitted signal. When the returning light signal indicates that an object, surface, or person is at a distance within the threshold distance, the system 100 may determine that the object, surface, or person is within the field 126, the field 126, or the field 128 (e.g., is too proximal), and may alter operation of the system 100 (e.g., by slowing down or stopping one or more of the components). Based on the component's operational speed or force, and based on the LIDAR-determined distance to an object, surface, or person, the system 100 may determine a time or rate at which to slow down or stop in order to avoid a collision with the object, surface, or person. When the returning light signal indicates that an object, surface, or person is at a distance exceeding the corresponding distance threshold, the system 100 may determine that there are no objects, surfaces, or people proximal enough to pose an operational safety risk, and the system 100 may continue its operations.

In one or more embodiments, the system 100 may use deceleration profiles to determine when to slow down movement and at what rates and times. For example, given a LIDAR-detected distance between the system 100 and a person, object, or surface, the system 100 may identify a deceleration profile based on the kinematic state of the system 100. For example, given the type or speed of movement of the system 100 and the distance to a person, object, or surface, the robot may select a deceleration profile which may govern the rate at which the system 100 may decelerate given the amount of time the system 100 has before colliding with or coming within a threshold distance of the person, object, or surface.

In one or more embodiments, the field 126, the field 128, and/or the field 130 may overlap. The system 100 may be configured to recognize the overlap of fields so that such overlapping is not interpreted as a person, object, or surface entering one of the fields.

In one or more embodiments, the sensor 118, the sensor 120, and the sensor 123 may be active multidimensional sensors capable of emitting laser pulses and scanning a range of angles. The sensor 118, the sensor 120, and the sensor 123 may emit light waves from lasers, and may calculate the time of flight (ToF) of the return signals reflected back to the sensor 118, the sensor 120, and the sensor 123 (e.g., the time from which a signal was emitted to the time when the return signal is received after reflecting off of a person, object, or surface). The system 100 may measure the intensity and/or time of flight of the return signals received by the sensor 118 and the sensor 120, and the intensity and/or time of flight may be indicative of the distance to a person, object, or user. The sensor 118, the sensor 120, and the sensor 123 may use one or more scanning methods such as dual oscillating plane mirrors, dual axis scanner and polygonal mirrors. The sensor 118, the sensor 120, and the sensor 123 may use diode-pumped lasers. The sensor 118, the sensor 120, and the sensor 123 may use one or more photodetectors to read and record return signals. The sensor 118, the sensor 120, and the sensor 123 may use separate transmitters/emitters and receivers. The sensor 118, the sensor 120, and the sensor 123 may detect reflected light signals and may convert the light signals into electrical signals for analysis regarding the distance to a reflected object, person, or surface.

In one or more embodiments, the system 100 may represent a robot or machine (e.g., including the component 102, the component 110, the component 112) that may operate at one or more speeds to perform one or more actions, such as lifting, pushing, carrying, pulling, rotating, etc. The kinematic states of the robot or machine at a given time may be representative of a movement speed, acceleration, rotation, force, or other physical characteristic associated with movement. When a person, object, or surface is detected within the field 126 or the field 128, the robot may slow down or stop movement of one or more components over a given time according to a deceleration profile.

In one or more embodiments, the component 102, the component 110, and/or the component 112 may be moveable components.

In one or more embodiments, any of the sensors (e.g., the sensor 118, the sensor 120, and the sensor 123) may communicate over one or more communication networks 162 with one or more servers 164. The one or more servers 164 may store and provide movement profile data, deceleration profiles, and may receive data associated with signals sent and received by the sensors. The one or more servers 164 may determine the threshold times and distances, and may send commands to control any of the components (e.g., to circuitry associated with one or more motors which may control the system 100). Example communications networks for the one or more communication networks 162 may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others.

Figure 1B:
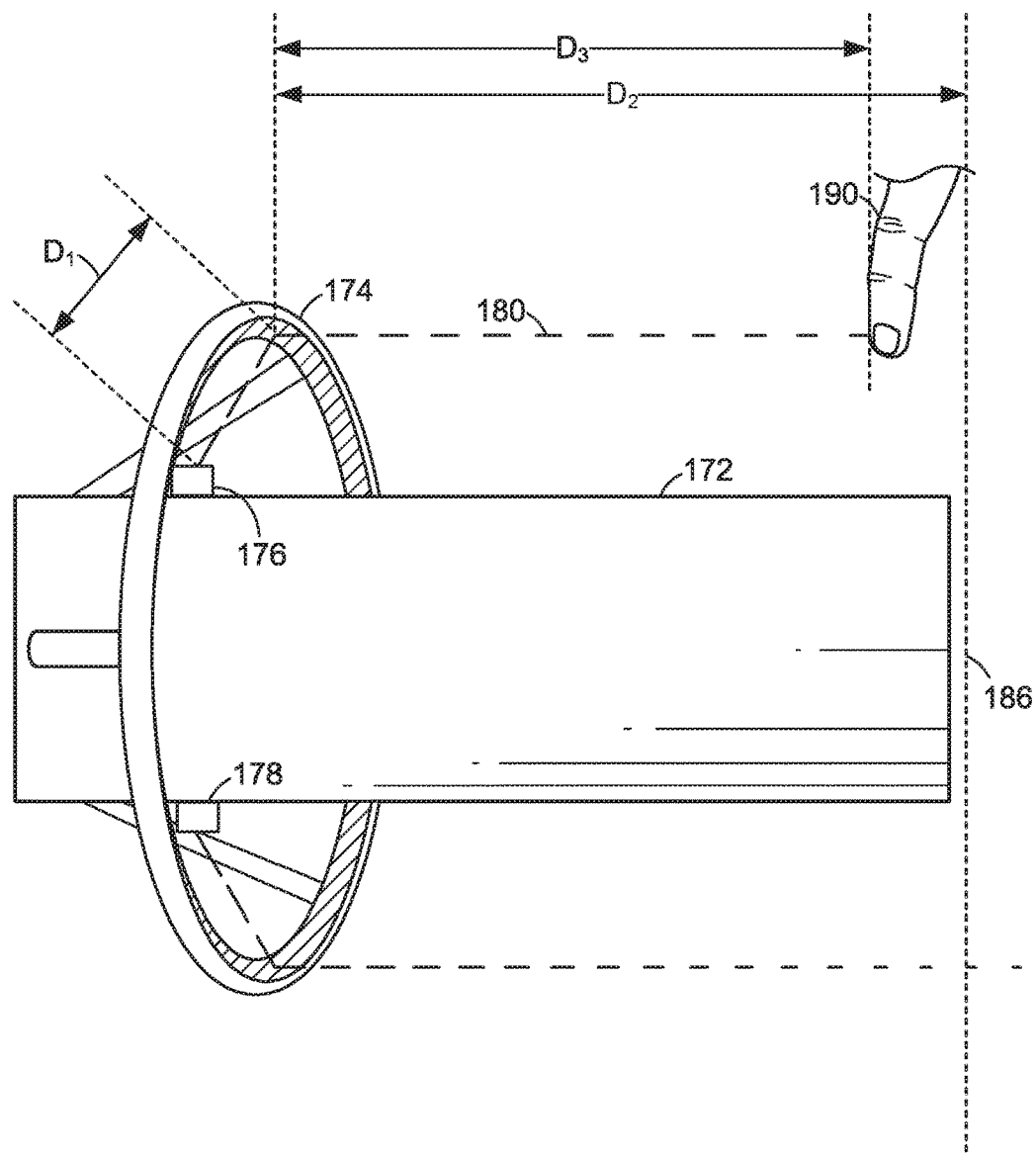
FIG. 1B illustrates an example system for LIDAR safety rings, in accordance with one or more example embodiments of the present disclosure.

FIG. 1B illustrates an example system 170 for LIDAR safety rings, in accordance with one or more example embodiments of the present disclosure.

Referring to FIG. 1B, the system 170 may include one or more components (e.g., component 172), which may be surrounded at least partially by a reflective surface 174. The reflective surface 174 may have the same characteristics and functionality as the reflective surface 122, the reflective surface 124, and/or the reflective surface 125 of FIG. 1A. As shown in FIG. 1B, the reflective surface 174 may be angled to cause the reflection of light signals emitted by one or more sensors (e.g., sensor 176, sensor 178) in an outward direction (e.g., toward the opposite end of the component 172 as the reflective surface 174). For example, the reflective surface 174 may be a curved mirror positioned to receive and reflect light signals (e.g., light signal 180) from the one or more sensors, to receive returning light signals reflected back (e.g., from a finger 190), and to reflect the returning light signals back to the one or more sensors.

Still referring to FIG. 1B, the signals emitted by the sensor 176 may be emitted at different angles relative to the axis shown. For example, the sensor 176 may emit the signal 180 at an angle (see FIG. 2A for illustration of the angles). The system 170, knowing the angles at which the signals are sent, may determine the corresponding distances that the signals may travel before reaching the reflective surface 174 given the shape of the surface, may identify the angles at which the respective signals reflect off of the reflective surface 174, and therefore may determine a target distance for a respective signal to reach a distance boundary 186 corresponding to the shape of a field (e.g., the field 126, the field 128, the field 130 of FIG. 1A). For example, when the sensor 176 emits the signal 180, the system 170 (e.g., the sensor 176) may determine that the signal 180 should travel a distance $D_1$ before reaching the reflective surface 174, and that the signal 180 should travel a threshold distance of $D_2$ before reflecting off of any object (e.g., the distance $D_2$ may represent a distance from the reflective surface 174 and a distance boundary 186 corresponding to a boundary of a field). The distance $D_1$ and/or the distance $D_2$ may be based on a kinematic state (e.g., movement profile) of the component 172 (e.g., a moveable component). Based on the distance $D_1$ and the distance $D_2$, the system 170 may determine a threshold time of flight for the signal 180. The threshold time of flight may correspond to an amount of time which the signal 180 should travel before colliding with an object, person, or surface. When the system 170 determines that the returning light signal from the signal 180 returned within the threshold time of flight (e.g., the actual time of flight was shorter than the threshold time of flight), the system 170 may determine that something (e.g., a finger 190) may be within the distance $D_2$ from the component 172 and may change the operation of the component 172.

In one or more embodiments, when the sensor 176 transmits the signal 180, the sensor 176 may measure whether a respective return signal (e.g., a reflection of the signal 180 off of a person, object, or surface) results in a calculation that the signal 180 traveled at least the threshold distance (e.g., distance $D_2$) associated with the field. For example, when the signal 180 reflects off of an object, person, or surface (e.g., the finger 190), the system 170 (e.g., the sensor 176) may determine (e.g., based on time of flight, the speed of light, and the distance $D_1$) whether the distance that the signal 180 traveled exceeded the threshold distance (e.g., distance $D_2$). When the distance that the signal 180 traveled before reflecting off of an object, person, or surface is within the threshold distance, then the system 170 may determine that the object, person, or surface is within the threshold distance.

In one or more embodiments, the sensor 176 may scan a range of angles for return signals, and based on the angle at which a return signal is received, the system 170 may determine the threshold boundary 186. When the signal 180 reflects off of an object, person, or surface (e.g., the finger 190), the system 170 (e.g., the sensor 176) may determine (e.g., based on time of flight and the speed of light) whether the distance that the signal 180 traveled exceeded the threshold distance (e.g., distance $D_2$). When the distance that the signal 180 traveled before reflecting off of an object, person, or surface is within the threshold distance, then the system 170 may determine that the object, person, or surface is within the distance boundary 186 of the component 172.

As shown in FIG. 1B, the angles at which the signals (e.g., signal 174) reflect off of the reflective surface 174 may be 90 degrees to create a field based on the shape of the reflective surface 174 (e.g., when the reflective surface 174 is a ring, the signals reflecting off of the reflective surface 174 may form a three-dimensional cylinder extending to the right of the page from the reflective surface, with the component 172 inside of the field). To create 90 degree reflections for signals emitted at different angles from the sensor 176 and the sensor 178, the reflective surface may include multiple reflective surfaces each positioned to create a normal angle with a respective signal emitted at a respective angle. Other examples of creating 90 degree reflections are discussed below with respect to FIG. 3B, FIG. 3C, and FIG. 3D.

Figure 2A:
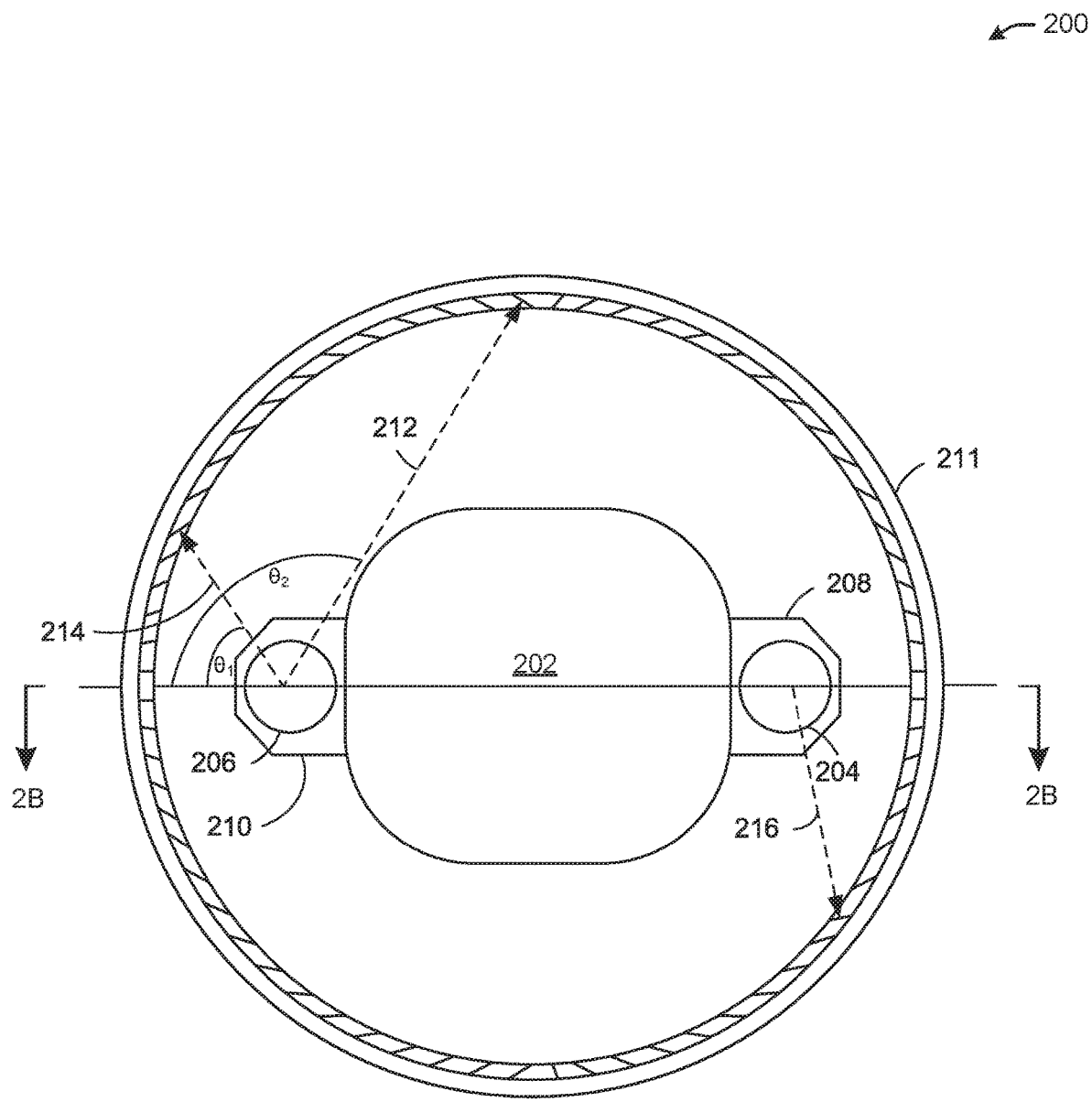
FIG. 2A illustrates a top view of a system for LIDAR safety rings, in accordance with one or more example embodiments of the present disclosure.

FIG. 2A illustrates a top view of a system 200 for LIDAR safety rings, in accordance with one or more example embodiments of the present disclosure.

Referring to FIG. 2A, the system 200 may include a machine component 202 (e.g., such as the component 110 or the component 112 of FIG. 1A), a sensor 204, a sensor 206, a connector 208 (e.g., the connection point 116 or the connection point 114 of FIG. 1A), a connector 210 (e.g., the connection point 116 or the connection point 114 of FIG. 1A), and a reflective surface 211 (e.g., the reflective surface 122 or the reflective surface 124 of FIG. 1A, the reflective surface 174 of FIG. 1B). The sensor 204 and the sensor 206 may be mounted to or otherwise operatively connected to the machine component 202 (e.g., via the connector 208 and the connector 210).

Still referring to FIG. 2A, the sensor 204 and the sensor 206 may emit or otherwise transmit one or more signals (e.g., light signals using laser pulses) in different directions (e.g., at different angles from the sensor 204 and the sensor 206, respectively). For example, the sensor 206 may emit the signal 214 at an angle $\theta_1$ toward the reflective surface 211, may emit the signal 212 at an angle $\theta_2$ toward the reflective surface 211. Any of the signals may be transmitted at different respective angles toward the reflective surface 211, which may surround the machine component 202 partially (not shown) or completely. The signals may reflect off of the reflective surface 211 and in different directions (e.g., into and out of the page) to create a shaped field around the machine component 202. Based on the angles (e.g., $\theta_1$ and $\theta_2$), the respective distances for a signal to reach the reflective surface 211 (e.g., distance $D_1$ of FIG. 1B) and to reach a threshold distance from the component 202 or the reflective surface 211 (e.g., distance D3 of FIG. 1B) may be determined. A threshold time of flight may be determined based on the respective distances and compared to an actual time of flight for any light signal to determine whether any object is too close to the component 202.

In one or more embodiments, the sensor 204 and the sensor 206 may be used in combination to achieve full 360 degree coverage around the component 202. For example, the sensor 206 may cover less than 360 degrees (e.g., 270 degrees), and the sensor 204 may cover less than 360 degrees, but arranged in combination, the sensors may emit and receive light signals in a full 360 degree range.

In one or more embodiments, the signals emitted by the sensor 204 and/or the sensor 206 may reflect off of the reflective surface 211 (e.g., a concave shaped surface) to create a field around the machine component 202 (e.g., the field 126, the field 128, or the field 130 of FIG. 1A). The field may be toroidal, elliptical, cylindrical, conical, or another shape, and may represent one or more threshold distances from the machine component 202. The field may also be referred to as a zone.

In one or more embodiments, the sensor 204 and the sensor 206 may include LIDAR scanners used to generate a force field (or zone) around the machine component 202 and to detect when any objects or surfaces breach the force field. When an object or surface comes within the force field (e.g., within a threshold distance of a robot), the machine component 202 may change or stop operations. The force field may consist of LIDAR safety rings around the machine component 202.

In one or more embodiments, the reflective surface 211 may form a ring around the machine component 202. The reflective surface 211 may be concave or otherwise shaped to reflect signals sent from the sensor 204 and the sensor 206 at different angles to create a surrounding force field or zone around the machine component 202. For example, a reflective surface in a toroidal shape attached to or otherwise arranged around the machine component 202 may reflect the signals transmitted at different angles in a manner that creates a field or zone around the machine component 202. The field may take a shape dependent on the shape and arrangement of the reflective surface 211 relative to the machine component 202 and/or the sensor 204 and the sensor 206. For example, the field may be elliptical, cylindrical, conical, polygonal, or another shape which at least partially engulfs all or a portion of the machine component 202. The field may represent a series of LIDAR rings (or other shapes surrounding the robot) which, when crossed by an object or person, may result in an operational change of the machine component 202 in order to avoid a collision.

In one or more embodiments, when the respective light signals reflect off of an object or person, the light signals may reflect back to the reflective surface 211, and from the reflective surface 211 back to the sensor 204 and the sensor 206. The system 200 may use the returning light signals (e.g., the light signals reflected back to the sensors after being transmitted toward the reflective surface 211) to determine the distances from which the returning light signals were reflected (e.g., a distance to an object, surface, or person from which the light signals were reflected). Given the angle at which a respective light signal is transmitted, the system 200 may determine a distance threshold for any respectively transmitted light signal (e.g., distance $D_1$ and distance $D_3$ of FIG. 1B). For example, a transmission of a light signal at one angle (e.g., the signal 214 at angle $\theta_1$) may result in a different distance threshold than the distance threshold for a light signal transmitted at a different angle (e.g., the signal 212 at angle $\theta_2$). The respective distance thresholds may correspond to the field or zone around the machine component 202 (e.g., the distances from the machine component 202 which define the field or zone around the machine component 202).

In one or more embodiments, the system 200 may determine, for any respectively transmitted light signal, whether the corresponding returning light signal indicates that an object, surface, or person is within the corresponding distance threshold for the light signal given the angle at which the light signal was transmitted. When the returning light signal indicates that an object, surface, or person is at a distance within the threshold distance, the system 200 may determine that the object, surface, or person is within the field or zone around the machine component 202 (e.g., is too proximal), and may alter the machine component 202 operation (e.g., by slowing down or stopping all or a portion of the machine component 202). Based on the operational speed or force of the machine component 202, and based on the LIDAR-determined distance to an object, surface, or person, the system 200 may determine a time or rate at which to slow down or stop in order to avoid a collision with the object, surface, or person. When the returning light signal indicates that an object, surface, or person is at a distance exceeding the corresponding distance threshold, the system 200 may determine that there are no objects, surfaces, or people proximal enough to pose an operational safety risk, and the machine component 202 may continue its operations.

Figure 2B:
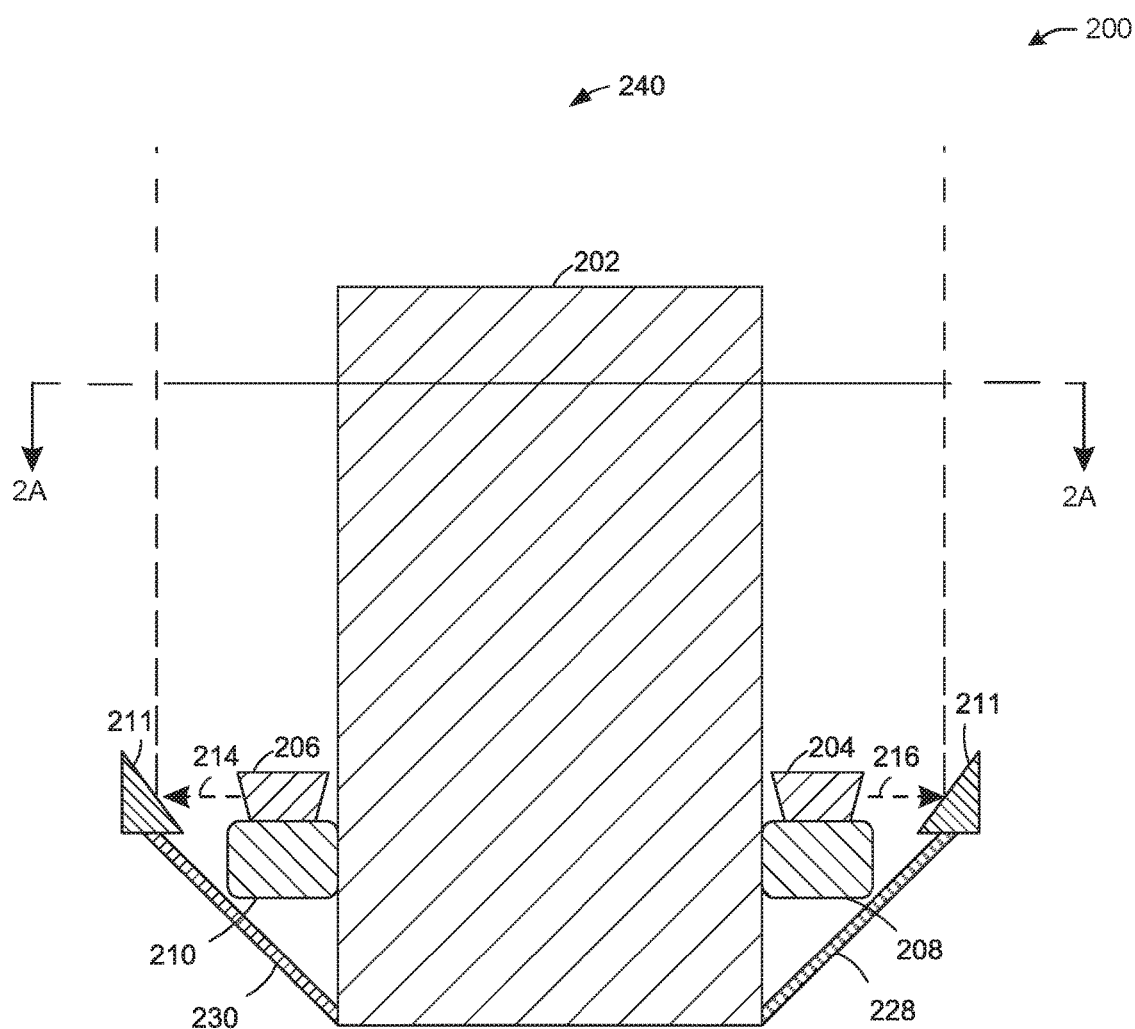
FIG. 2B illustrates a cross-sectional view of the system of FIG. 2A for LIDAR safety rings, in accordance with one or more example embodiments of the present disclosure.

FIG. 2B illustrates a cross-sectional view of the system 200 of FIG. 2A for LIDAR safety rings, in accordance with one or more example embodiments of the present disclosure.

The system 200 may include one or more connection components (e.g., connection component 228, connection component 230, which may include brackets or other connection mechanisms) to operatively connect the reflective surface 211 to the machine component 202. The reflective surface 211 may partially or completely surround the machine component 202 (e.g., a longitudinal central axis spanning between the respective ends of the machine component 202). The system 200 may protect the machine component 202 with a field 240 as explained further below.

In one or more embodiments, the sensor 204 may emit or otherwise transmit the signal 216, which may be reflected by the reflective surface 211 (e.g., in a direction toward the top of the page). Similarly, the sensor 206 may emit or otherwise transmit the signal 214, which may be reflected by the reflective surface 211 (e.g., in a direction toward the top of the page). The signal 214 and/or the signal 216 may travel a respective distance from the reflective surface 211 (e.g., distance $D_2$ of FIG. 1B) before reflecting off of a person, object, or surface (e.g., the finger 190 of FIG. 1B). When no return signal reflects back to the sensor 204 or to the sensor 206, then the system 200 may determine that the signal 214 and/or the signal 216 did not reflect off of a person, object, or surface within the field 240. When the sensor 204 and/or to the sensor 206 receive return a return signal representative of a reflection of the signal 214 and/or the signal 216, the system 200 may determine (e.g., given the angle of transmission of the signal 214 and/or the signal 216, or given the angle at which the respective return signal is received) a threshold distance corresponding to the boundary of the field 240, and may determine (e.g., based on time of flight or other data) that the person, object, or surface off of which the respective return signal was received is at a distance within the threshold distance (e.g., within the field 240) or outside of the threshold distance (e.g., outside of or exterior to the field 240). Based on the respective signal (e.g., the signal 214 and/or the signal 216), the system 200 may a threshold time of flight. The threshold time of flight may correspond to an amount of time that an emitted light signal is expected to travel from its time of emission to the time its returning signal is received and identified. When a light signal returns too quickly (e.g., the time of flight is less than a threshold time of flight), then the system 200 may determine that an object is within a threshold distance of the component 202, and may change the operation of the component 202.

In one or more embodiments, the reflective surface 211 may form a ring around the machine component 202. The reflective surface 211 may be concave or otherwise shaped to reflect signals sent from the sensor 204 and the sensor 206 at different angles to create the field 240 around the machine component 202. For example, a reflective surface in a toroidal shape attached to or otherwise arranged around the machine component 202 may reflect the signals transmitted at different angles in a manner that creates the field 240 around the machine component 202. The field 240 may take a shape dependent on the shape and arrangement of the reflective surface 211 relative to the machine component 202 and/or the sensor 204 and the sensor 206. For example, the field 240 may be elliptical, cylindrical, conical, polygonal, or another shape which at least partially engulfs all or a portion of the machine component 202. The field 240 may represent a series of LIDAR rings (or other shapes surrounding the robot) which, when crossed by an object or person, may result in an operational change of the machine component 202 in order to avoid a collision.

In one or more embodiments, the system 200 may determine, for any respectively transmitted light signal, whether the corresponding returning light signal indicates that an object, surface, or person is within the corresponding distance threshold for the light signal given the angle at which the light signal was transmitted or at which the return signal was received. When the returning light signal indicates that an object, surface, or person is at a distance within the threshold distance, the system 200 may determine that the object, surface, or person is within the field 240 (e.g., is too proximal to the machine component 202), and may alter the machine component 202 operation (e.g., by slowing down or stopping all or a portion of the machine component 202). Based on the operational speed or force of the machine component 202, and based on the LIDAR-determined distance to an object, surface, or person, the system 200 may determine a time or rate at which to slow down or stop in order to avoid a collision with the object, surface, or person. When the returning light signal indicates that an object, surface, or person is at a distance exceeding the corresponding distance threshold, the system 200 may determine that there are no objects, surfaces, or people proximal enough to pose an operational safety risk, and the machine component 202 may continue its operations.

Figure 2C:
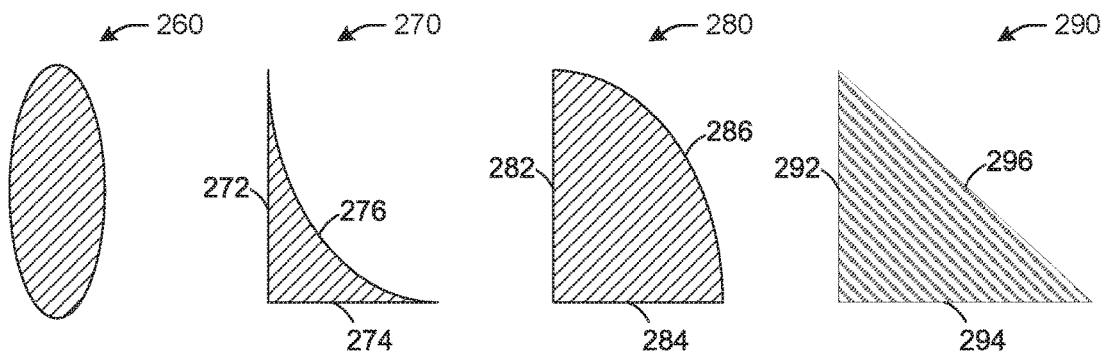
FIG. 2C illustrates cross-sectional views of reflective surfaces for LIDAR safety rings, in accordance with one or more example embodiments of the present disclosure.

FIG. 2C illustrates cross-sectional views of reflective surfaces for LIDAR safety rings, in accordance with one or more example embodiments of the present disclosure.

Referring to FIG. 2C, the cross-sectional views may represent cross-sections of a reflective surface (e.g., the reflective surface 211 of FIG. 2A) according to the different shapes and curvatures that a reflective surface may have. The cross-sectional views shown in FIG. 2C are not meant to be exhaustive, but rather illustrate multiple ways of reflecting light signals with a reflective surface to create LIDAR safety zones or fields. For example, cross-section 260 may refer to a toroidal-shaped reflective surface. Cross-section 270 may refer to a concave-shaped reflective surface. In particular, the concave surface 276 may be the reflective surface (e.g. a concave-shaped mirror). The surface 272 and/or the surface 274 may be part of the reflective surface, or may be outer edges holding the concave surface 276. Cross-section 280 may refer to a convex-shaped reflective surface. In particular, the convex surface 286 may be the reflective surface (e.g. a convex-shaped mirror). The surface 282 and/or the surface 284 may be part of the reflective surface, or may be outer edges holding the convex surface 286. The cross-section 290 may refer in more detail to the cross-section of the reflective surface 211 of FIG. 2B. In particular, the cross-section 290 may include two outer edges, edge 292 and edge 294, which may hold or be a part of an angled edge 296, which may reflect light signals (e.g., the signal 214 and the signal 216 of FIG. 2B).

Referring to FIG. 2C, the cross-sections shown may represent portions of a reflective surface, with each portion positioned to create a normal angle of incidence with a respective signal emitted by a sensor. In this manner, a respective signal emitted at an angle may reflect off of a reflective surface at a 90 degree angle. For example, the respective cross-sections shown may be positioned at different angles (e.g., every five degrees around a ring-shaped reflective surface) so that different portions of a reflective surface represented by the cross-sections may be angled different from one another to create a 90 degree angle of incidence with emitted signals. Other ways of creating 90 degree reflections with reflective surfaces are discussed below with respect to FIGS. 3B, 3C, and 3D.

Figure 3A:
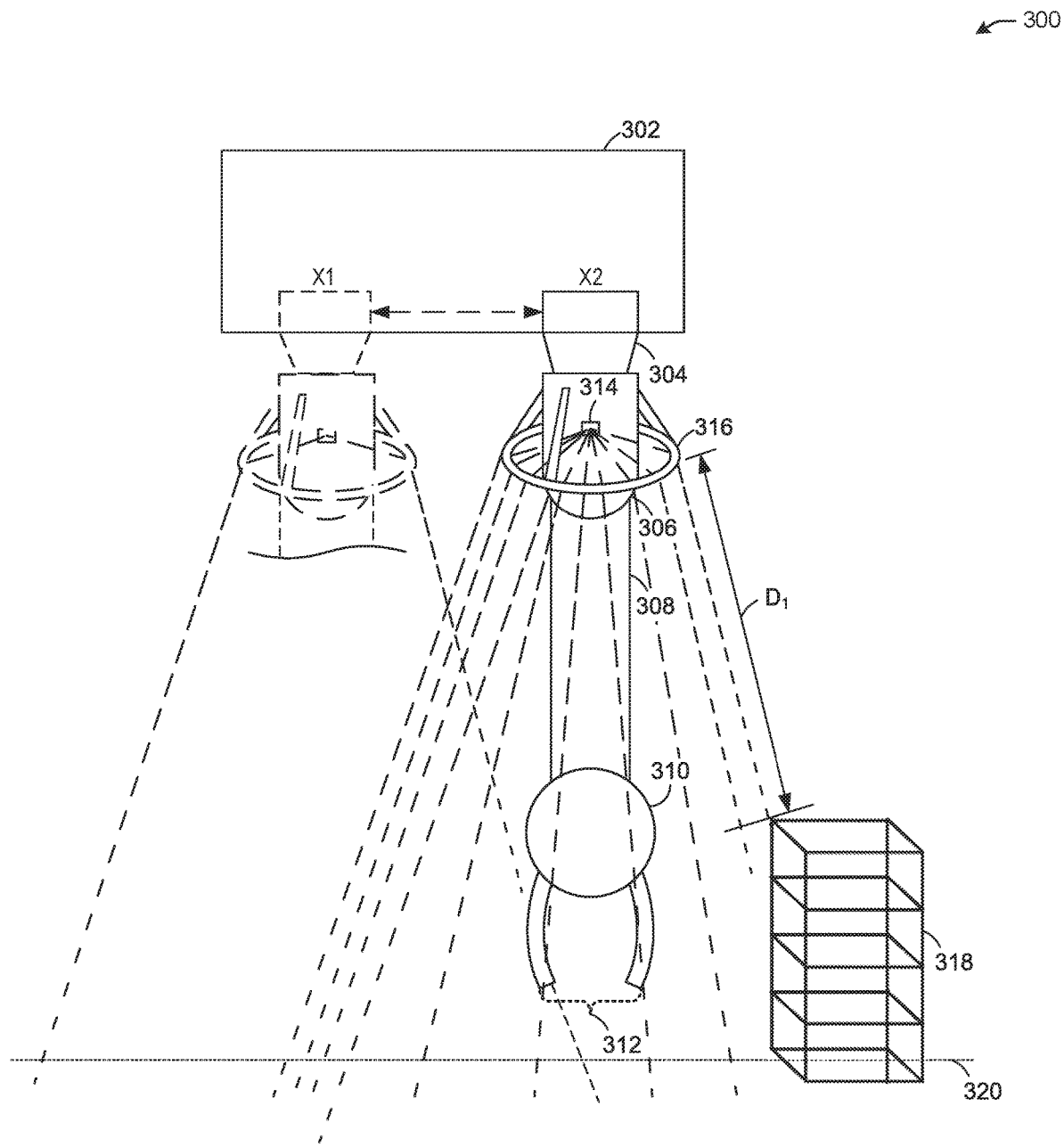
FIG. 3A illustrates an example system for LIDAR safety rings, in accordance with one or more example embodiments of the present disclosure.

FIG. 3A illustrates an example system 300 for LIDAR safety rings, in accordance with one or more example embodiments of the present disclosure.

The system 300 may include a gantry system or other type of machine, for example, capable of supporting equipment, materials, and supplies. The system 300 may include a component 302, a component 304 operatively connected to the component 302, an a component 306 operatively connected to the component 304. The component 306 may be operatively connected to a component 308, which may be operatively connected to a component 310. The component 310 may be operatively connected to a component 312, which may lift and support materials, equipment, and supplies. The component 312 may include one or more components.

Still referring to FIG. 3A, the component 306 may operatively connect to a sensor 314 (e.g., at a connection point connecting the component 304 and the component 306) and to a reflective surface 316. The sensor 314 may include the characteristics and functionality of the sensor 204 and the sensor 206 of FIG. 2A and FIG. 2B, for example. The reflective surface 316 may include the characteristics and functionality of the reflective surface 211 of FIG. 2A and FIG. 2B.

In one or more embodiments, the signals emitted by the sensor 314 may reflect off of the reflective surface 316 (e.g., a concave shaped surface) to create a conical shaped or other type of field around the component 308 (e.g., around a longitudinal central axis spanning between respective ends of the component 308). The field may be toroidal, elliptical, cylindrical, conical (e.g., as shown), or another shape, and may represent one or more threshold distances (e.g., distance 320) from the component 308.

In one or more embodiments, the sensor 314 may include LIDAR scanners used to generate the field around the component 308 and to detect when any objects or surfaces breach the field (e.g., are within the distance 320). When an object or surface comes within the field, the component 308 may change or stop operations.

In one or more embodiments, the reflective surface 316 may form a ring around the component 308. The reflective surface 316 may be concave or otherwise shaped to reflect signals sent from the sensor 314 at different angles to create the field around the component 308. For example, a reflective surface in a toroidal shape attached to or otherwise arranged around the component 308 may reflect the signals transmitted at different angles in a manner that creates the field around the component 308. The field may take a shape dependent on the shape and arrangement of the reflective surface 316 relative to the component 308 and/or the sensor 314. For example, the field may be elliptical, cylindrical, conical, polygonal, or another shape which at least partially engulfs all or a portion of the component 308. The field may represent a series of LIDAR rings (or other shapes surrounding the gantry) which, when crossed by an object or person, may result in an operational change of the machine component 308 in order to avoid a collision.

In one or more embodiments, when the respective light signals reflect off of an object or person, the light signals may reflect back to the reflective surface 316, and from the reflective surface 316 back to the sensor 314. The system 300 may use the returning light signals (e.g., the light signals reflected back to the sensors after being transmitted toward the reflective surface 316) to determine the distances from which the returning light signals were reflected (e.g., a distance to an object, surface, or person from which the light signals were reflected). Given the angle at which a respective light signal is transmitted or at which the returning light signal is received, the system 300 may determine a distance threshold for any respectively transmitted light signal. For example, a transmission or reception of a light signal at one angle may result in a different distance threshold than the distance threshold for a light signal transmitted or received at a different angle. The respective distance thresholds may correspond to the field (e.g., may define the distance boundaries from the machine component 308).

As shown in FIG. 3A, a shelf 318 or another object may be within a distance $D_1$ when the system 300 is in position $X_2$. The shelf 318 may be an object whose position is stored by the system 300 (e.g., using the sensor 314 or another device), and the position $X_2$ may correspond to a kinematic state (e.g., a movement profile). Based on the kinematic state at position $X_2$, the system 300 may determine the distance $D_1$ to the shelf 318, which may represent a threshold distance for the field. The same light signal, when the system 300 is at position $X_1$, may be allowed to travel the distance 320 before colliding with an object. Therefore, the distance threshold at position $X_2$ may be distance $D_1$ for a light signal, and a distance longer than $D_1$ at position $X_1$. When an object is within a respective threshold distance (or causes a time of flight shorter than a threshold time of flight corresponding to a distance threshold), the system 300 may determine that an object is too close to the component 308, and may adjust the operation of the component 308. The position $X_1$ and the position $X_2$ may be defined by the movement profile. When the system 300 is at one of the positions, the system 300 may determine respective distance thresholds (e.g., based on the known position of the shelf 318). Therefore, the kinematic state of the system 300 may be considered when determining the distance thresholds, such as distance $D_1$.

Figure 3B:
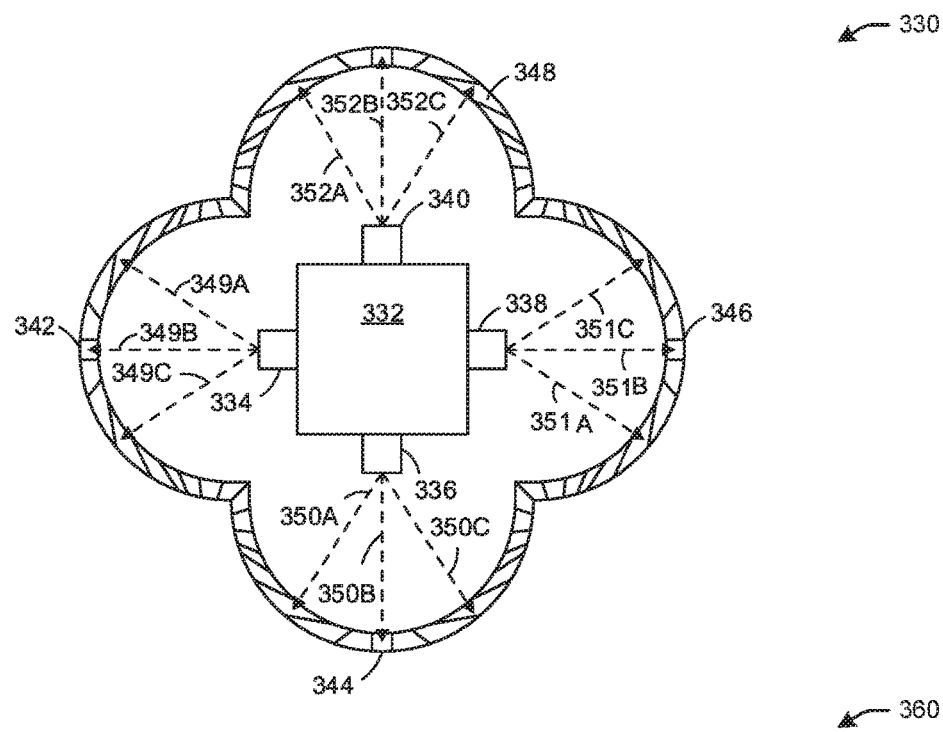
FIG. 3B illustrates a top view of a system for LIDAR safety rings, in accordance with one or more example embodiments of the present disclosure.

FIG. 3B illustrates a top view of a system 330 for LIDAR safety rings, in accordance with one or more example embodiments of the present disclosure.

Referring to FIG. 3B, the system 330 may include a component 332 (e.g., similar to the component 202 of FIG. 2A) and multiple sensors (e.g., sensor 334, sensor 336, sensor 338, sensor 340) surrounding the component 332 to create 360 degree signal coverage around the component 332. The sensors each may be partially surrounded by a reflective surface (e.g., the sensor 334 may be partially surrounded by the reflective surface 342; the sensor 336 may be partially surrounded by the reflective surface 344; the sensor 338 may be partially surrounded by the reflective surface 346; the sensor 340 may be partially surrounded by the reflective surface 348). The reflective surfaces may be curved so that any signal emitted by a corresponding sensor may reflect at an angle of 90 degrees. For example, the sensor 334 may emit signal 349A, signal 349B, and signal 349C at different respective angles, and the signal 349A, the signal 349B, and the signal 349C may reflect off of the reflective surface 342 at a 90 degree angle (e.g., coming out of the page). The sensor 336 may emit signal 350A, signal 350B, and signal 350C at different respective angles, and the signal 350A, the signal 350B, and the signal 350C may reflect off of the reflective surface 344 at a 90 degree angle (e.g., coming out of the page). The sensor 338 may emit signal 351A, signal 351B, and signal 351C at different respective angles, and the signal 351A, the signal 351B, and the signal 351C may reflect off of the reflective surface 346 at a 90 degree angle (e.g., coming out of the page). The sensor 340 may emit signal 352A, signal 352B, and signal 352C at different respective angles, and the signal 352A, the signal 352B, and the signal 352C may reflect off of the reflective surface 348 at a 90 degree angle (e.g., coming out of the page).

Figure 3C:
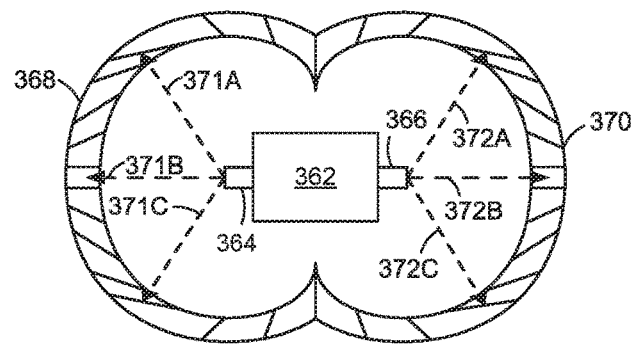
FIG. 3C illustrates a top view of a system for LIDAR safety rings, in accordance with one or more example embodiments of the present disclosure.

FIG. 3C illustrates a top view of a system 360 for LIDAR safety rings, in accordance with one or more example embodiments of the present disclosure.

Referring to FIG. 3C, the system 360 may include a component 362 (e.g., similar to the component 202 of FIG. 2A) and multiple sensors (e.g., sensor 364, sensor 366) surrounding the component 362 to create 360 degree signal coverage around the component 362. The sensors each may be partially surrounded by a reflective surface (e.g., the sensor 364 may be partially surrounded by the reflective surface 368; the sensor 366 may be partially surrounded by the reflective surface 370). The reflective surfaces may be curved so that any signal emitted by a corresponding sensor may reflect at an angle of 90 degrees. For example, the sensor 364 may emit signal 371A, signal 371B, and signal 371C at different respective angles, and the signal 371A, the signal 371B, and the signal 371C may reflect off of the reflective surface 368 at a 90 degree angle (e.g., coming out of the page). The sensor 366 may emit signal 372A, signal 372B, and signal 372C at different respective angles, and the signal 372A, the signal 372B, and the signal 372C may reflect off of the reflective surface 370 at a 90 degree angle (e.g., coming out of the page).

Figure 3D:
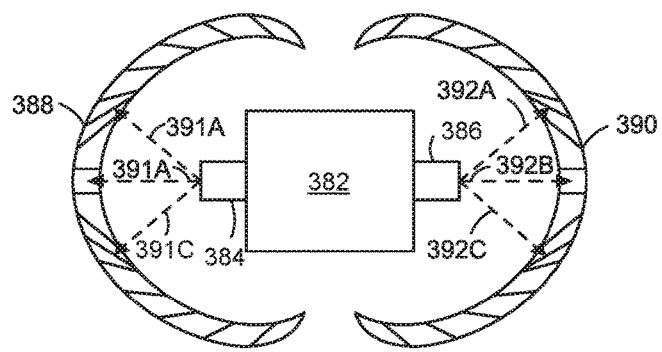
FIG. 3D illustrates a top view of a system for LIDAR safety rings, in accordance with one or more example embodiments of the present disclosure.

FIG. 3D illustrates a top view of a system 380 for LIDAR safety rings, in accordance with one or more example embodiments of the present disclosure.

Referring to FIG. 3D, the system 380 may include a component 382 (e.g., similar to the component 202 of FIG. 2A) and multiple sensors (e.g., sensor 384, sensor 386) surrounding the component 382 to create 360 degree signal coverage around the component 382. The sensors each may be partially surrounded by a reflective surface (e.g., the sensor 384 may be partially surrounded by the reflective surface 388; the sensor 386 may be partially surrounded by the reflective surface 390). The reflective surfaces may be curved so that any signal emitted by a corresponding sensor may reflect at an angle of 90 degrees. For example, the sensor 384 may emit signal 391A, signal 391B, and signal 391C at different respective angles, and the signal 391A, the signal 391B, and the signal 391C may reflect off of the reflective surface 388 at a 90 degree angle (e.g., coming out of the page). The sensor 386 may emit signal 392A, signal 392B, and signal 392C at different respective angles, and the signal 392A, the signal 392B, and the signal 392C may reflect off of the reflective surface 390 at a 90 degree angle (e.g., coming out of the page).

Figure 4A:
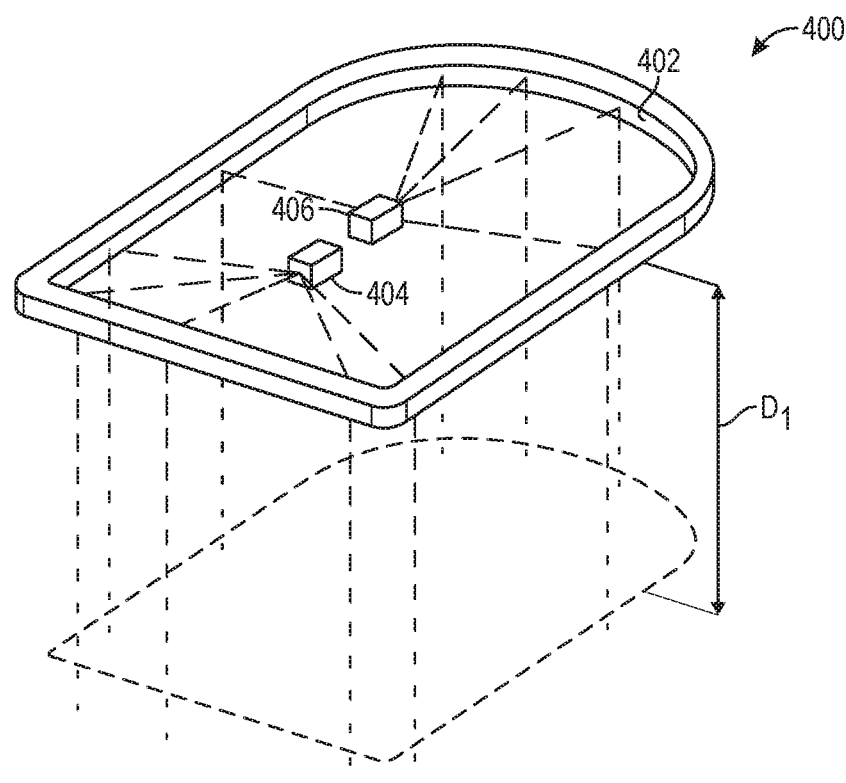
FIG. 4A illustrates an example system for LIDAR safety rings, in accordance with one or more example embodiments of the present disclosure.

FIG. 4A illustrates an example system 400 for LIDAR safety rings, in accordance with one or more example embodiments of the present disclosure.

The system 400 may include a reflective surface 402 and LIDAR devices (e.g., sensor 404, sensor 406), which may have the properties and operational capabilities as describe above with regard to the sensors in FIGS. 1A-3. The reflective surface 402 may have the properties and operational capabilities as describe above with regard to the reflective surfaces in FIGS. 1A-3. As shown in FIG. 4A, the shape of the reflective surface 402 may be different than a ring shape, and may create a field by reflecting light signals emitted by the LIDAR devices and using a distance threshold for any light signals (e.g., distance $D_1$). The system 400 may be included in a variety environments, including for use with robots or other machinery, security applications (e.g., surrounding an object or exhibit), vehicles, or other situations in which a zone may be created to detect the proximity of one object to another object.

Figure 4B:
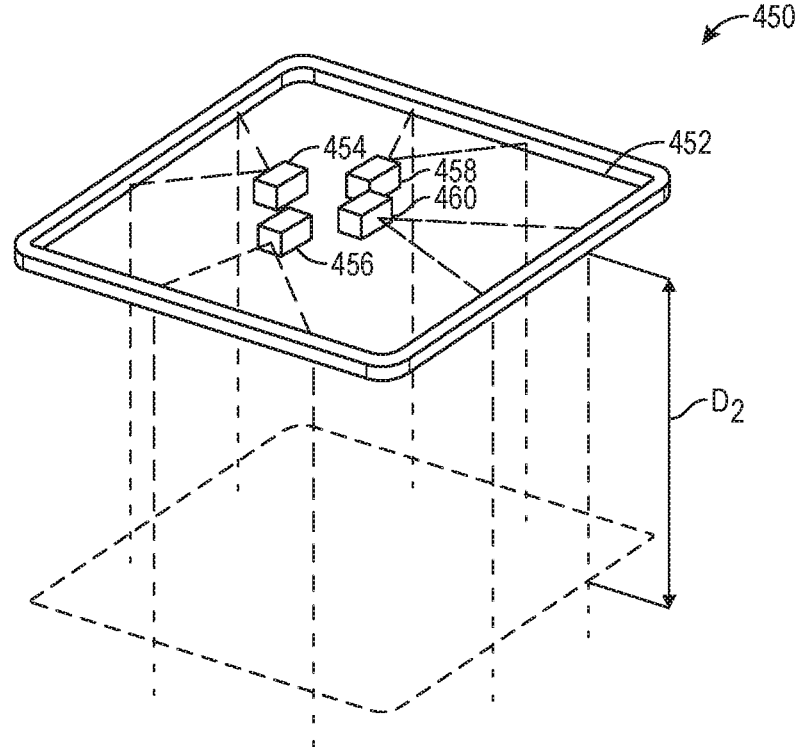
FIG. 4B illustrates an example system for LIDAR safety rings, in accordance with one or more example embodiments of the present disclosure.

FIG. 4B illustrates an example system 450 for LIDAR safety rings, in accordance with one or more example embodiments of the present disclosure.

The system 400 may include a reflective surface 452 and LIDAR devices (e.g., sensor 454, sensor 456, sensor 458, sensor 460), which may have the properties and operational capabilities as describe above with regard to the sensors in FIGS. 1A-3. The reflective surface 452 may have the properties and operational capabilities as describe above with regard to the reflective surfaces in FIGS. 1A-3. As shown in FIG. 4B, the shape of the reflective surface 452 may be different than a ring shape (e.g., a rectangular shape), and may create a field by reflecting light signals emitted by the LIDAR devices and using a distance threshold for any light signals (e.g., distance $D_1$). The system 450 may be included in a variety environments, including for use with robots or other machinery, security applications (e.g., surrounding an object or exhibit), vehicles, or other situations in which a zone may be created to detect the proximity of one object to another object.

Referring to FIGS. 1A-4B, the sensors may include or be operatively linked to one or more processors capable of determining the time of flight of signals emitted by a respective sensor, and determining a distance threshold for respective emitted signals based on the angles of emission (e.g., angle $\theta_1$ and angle $\theta_2$ of FIG. 2A). Using the angles of emission of light signals, the speed of light, and the known distance for a respective signal to travel to reflect off of a reflective surface, the one or more processors may determine a threshold time of flight associated with a threshold distance that a respective signal may before reaching a person, object, or surface. Based on the tie of reception of a return light signal, the one or more processors may determine an actual time of flight and whether the actual time of flight exceeds the threshold time of flight. When the actual time of flight exceeds the threshold time of flight, the one or more processors may determine that the time of flight corresponds to a distance exceeding the distance threshold, and therefore that no object is within the threshold distance. When the actual time of flight is within the threshold time of flight, the one or more processors may determine that the time of flight corresponds to a distance within the distance threshold.

Figure 4C:
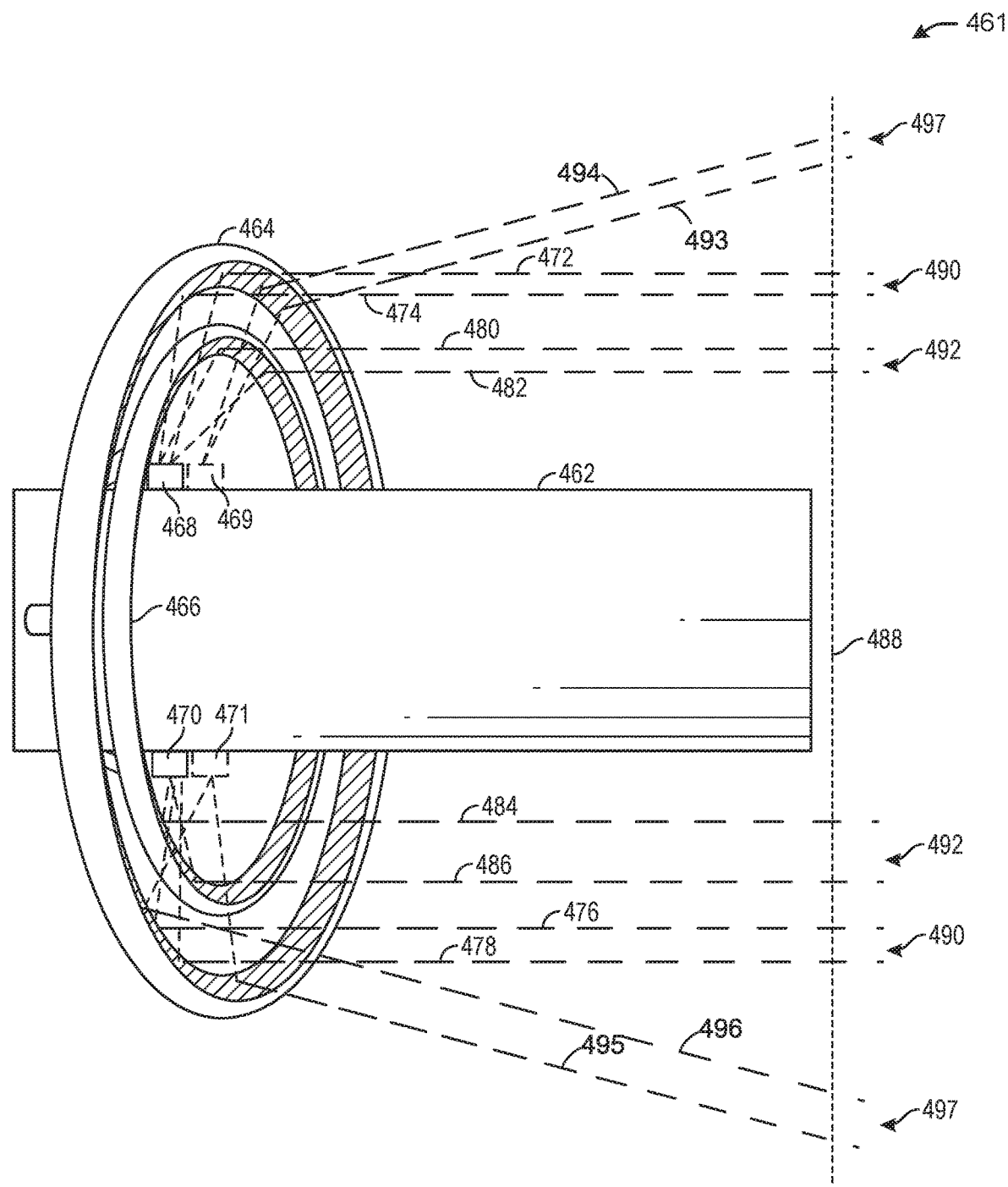
FIG. 4C illustrates an example system for LIDAR safety rings, in accordance with one or more example embodiments of the present disclosure.

FIG. 4C illustrates an example system 461 for LIDAR safety rings, in accordance with one or more example embodiments of the present disclosure.

Referring to FIG. 4C, the system 461 may include one or more components (e.g., component 462), which may be surrounded at least partially by multiple reflective surfaces (e.g., reflective surface 464, reflective surface 466). The reflective surface 464 and the reflective surface 466 may have the same characteristics and functionality as the reflective surface 122, the reflective surface 124, and/or the reflective surface 125 of FIG. 1A, but may have different sizes (e.g., the diameter of the reflective surface 464 may be larger than the diameter of the reflective surface 466). As shown in FIG. 4C, the reflective surface 464 and the reflective surface 466 may be angled to cause the reflection of light signals emitted by one or more sensors (e.g., sensor 468, sensor 470) in an outward direction (e.g., toward the opposite end of the component 462 as the reflective surface 464 and the reflective surface 466). For example, the reflective surface 464 may be a curved mirror positioned to receive and reflect light signals (e.g., light signal 472, light signal 474, light signal 476, light signal 480, light signal 480, light signal 482) from the one or more sensors, to receive returning light signals reflected back (e.g., from the finger 190 of FIG. 1B), and to reflect the returning light signals back to the one or more sensors. The light signal 472, the light signal 474, the light signal 476, and the light signal 478 may reflect off of the reflective surface 464, and based on a cutoff or threshold distance 488, the light signal 472, the light signal 474, the light signal 476, and the light signal 478 may form a field 490 (e.g., similar to the field 126, the field 128, and the field 130 of FIG. 1A) around the component 462. The light signal 480, the light signal 482, the light signal 484, and the light signal 486 may reflect off of the reflective surface 466, and based on the distance 488 (or a different distance threshold), the light signal 480, the light signal 482, the light signal 484, and the light signal 486 may form a field 492 (e.g., similar to the field 126, the field 128, and the field 130 of FIG. 1A) around the component 462. The field 490 and the field 492 may be concentric with one another by using the illustrated arrangement of the reflective surface 464 and the reflective surface 466. When the reflective surface 464 is a different shape than the reflective surface 466 (e.g., one is more circular, and the other is more elliptical), the field 490 and the field 492 may be different shapes.

As shown in FIG. 4C, the field 490 may be larger than the field 492 (e.g., the boundary of the field 490 may have a larger circumference than the boundary of the field 492). The system 461 may determine which field has been breached based on the respective light signal whose time of flight fails to meet a time threshold associated with the respective field. When the field 490 is breached and the field 492 is not breached a different deceleration profile (e.g., using less deceleration) may be selected than when the field 492 is breached (e.g., because a breach of the field 492 may indicate that an object is closer to the component 462 than when the field 490 is breached).

In one or more embodiments, multiple sensors may be used to generate multiple fields using a reflective surface. For example, sensor 468, sensor 469, sensor 470, and sensor 471 may send light signals that reflect off of the reflective surface 464. The sensor 469 may send signal 493 and signal 494 at different angles, and the signals may reflect off of the reflective surface to create a field 497 (e.g., shown as a conical-shaped field in FIG. 4C, but the field 497 may be another shape). The field 497 may be generated by the signal 495 and the signal 496 sent by the sensor 471. In this manner, the reflective surface 464 may reflect signals from multiple sensors to create multiple fields (e.g., field 490, field 497). For example, by using arrangements of multiple sensors, light signals may be sent at different angles so that the signals may be reflected to create different shaped fields based on the angles of reflection of the signals.

Still referring to FIG. 4C, the angles at which the signals reflect off of the reflective surface 464 and the reflective surface 466 may be 90 degrees to create the field 490 and the field 492, respectively, based on the shape of the reflective surface 464 (e.g., when the reflective surface 464 is a ring, the signals reflecting off of the reflective surface 464 may form a three-dimensional cylinder extending to the right of the page from the reflective surface, with the component 462 inside of the field 490). To create 90 degree reflections for signals emitted at different angles from the sensor 468 and the sensor 470, the reflective surfaces may include multiple reflective surfaces each positioned to create a normal angle with a respective signal emitted at a respective angle. Other examples of creating 90 degree reflections are discussed above with respect to FIG. 3B, FIG. 3C, and FIG. 3D.

Figure 5A:
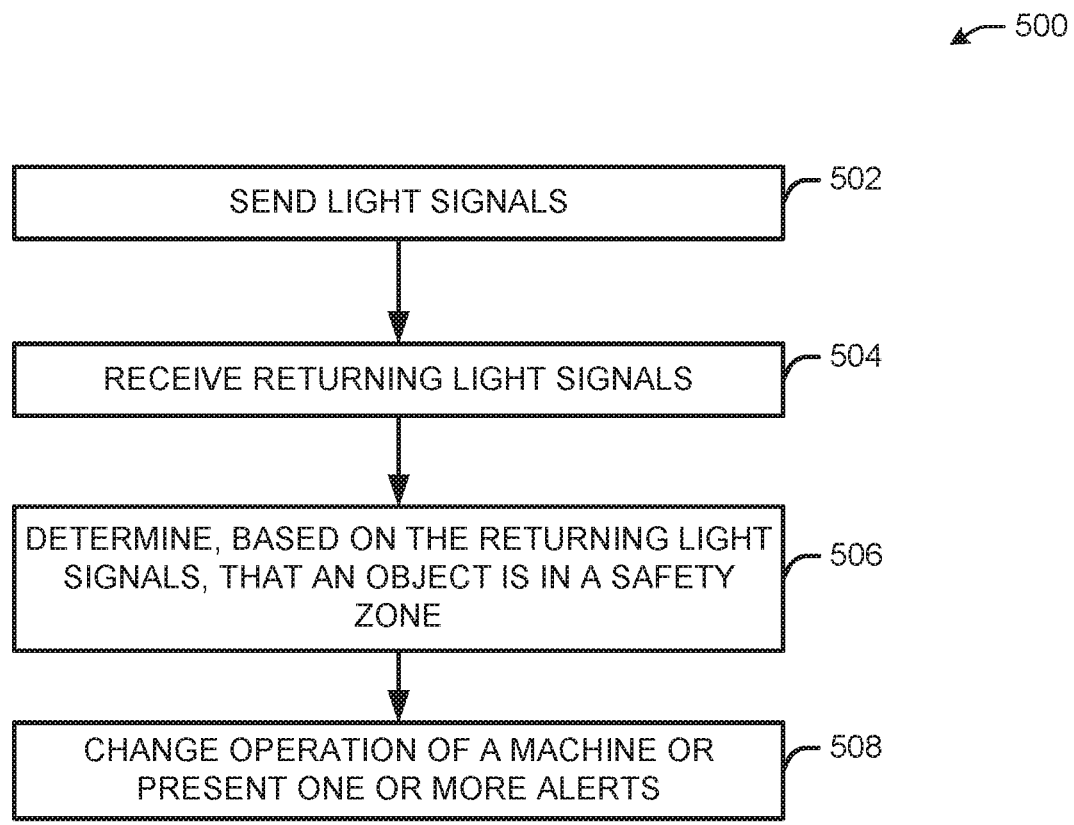
FIG. 5A illustrates a flow diagram for a process for using LIDAR safety rings, in accordance with one or more example embodiments of the present disclosure.

FIG. 5A illustrates a flow diagram for a process 500 for using LIDAR safety rings, in accordance with one or more example embodiments of the present disclosure.

At block 502, a LIDAR device (e.g., the sensor 118 or the sensor 120 of FIG. 1A) may send light signals at different angles of transmission. For example, the LIDAR device may emit laser pulses at multiple angles and directions. The LIDAR device may include optical signal emitters and LIDAR scanners. The LIDAR device may emit light signals at different angles in the direction of a reflective surface (e.g., the reflective surface 122 or the reflective surface 124 of FIG. 1A), which may reflect the emitted signals in different directions. The reflective surface may surround a machine or robot component to which the LIDAR device is mounted or otherwise operatively connected. The signals emitted or otherwise transmitted by the LIDAR device may be reflected off of the reflective surface, and may reflect off of people, objects, or surfaces.

At block 504, the LIDAR device may receive returning light signals. When an emitted signal from the LIDAR device reflects off of a person, object, or surface, a return signal is reflected back to the reflective surface, which may reflect the returning light signals back to the LIDAR device (e.g., the signal 180 reflecting off of the finger 190 of FIG. 1B). The signals emitted from the LIDAR device may reflect off of the reflective surface to create a field (e.g., the field 126 or the field 128 of FIG. 1A). The LIDAR device may identify the returning light signals (e.g., by frequency or another identifier) at a given angle, and may determine a corresponding distance for the returning light signal (e.g., the corresponding light signal emitted) to the reflective surface, and a corresponding distance from the reflective surface to a boundary of the field. The distances may be based on the kinematic state (e.g., movement profile) of the component of the robot or machine.

At block 506, the LIDAR device may determine, based on the returning light signals, that the object is within a zone or field (e.g., the field 126 or the field 128 of FIG. 1A) created by the emitted light signals reflected off of the reflective surface. The distance threshold associated with any light signal may correspond to a time of flight threshold for the light signal. The LIDAR device may determine the distance threshold and corresponding time of flight threshold for a signal, and may determine the actual time of flight for the signal based on the time that the returning signal was received. When the returning signal is identified within the time of flight threshold, the LIDAR device may determine that an object is within a threshold distance.

At block 08, the LIDAR device may change the movement or operation of at least a portion of a machine (e.g., the component 102, the component 110, the component 112 of FIG. 1A) with which the LIDAR device is associated to reduce movement, and/or may change the operation of another component (e.g., when the LIDAR device determines that the other component is within a distance threshold of the object and/or is closer to the object). For example, the LIDAR device may be mounted or otherwise operative connected to a machine, and the reflection of emitted signals from the device may create the field or zone around the machine. When the LIDAR device determines that the object, person, or surface is within the zone or field, the LIDAR device may reduce movement (e.g., a movement rate or acceleration associated with a movement profile) or otherwise alter operations of all or a portion of the machine to avoid or minimize contact with the object, person, or surface detected within the field or zone. The LIDAR device may cause the presentation of one or more alerts (e.g., alarms) or indications (e.g., sounds, vibrations, displayed text or graphics, audio, etc.) that the object is within the distance threshold.

Figure 5B:
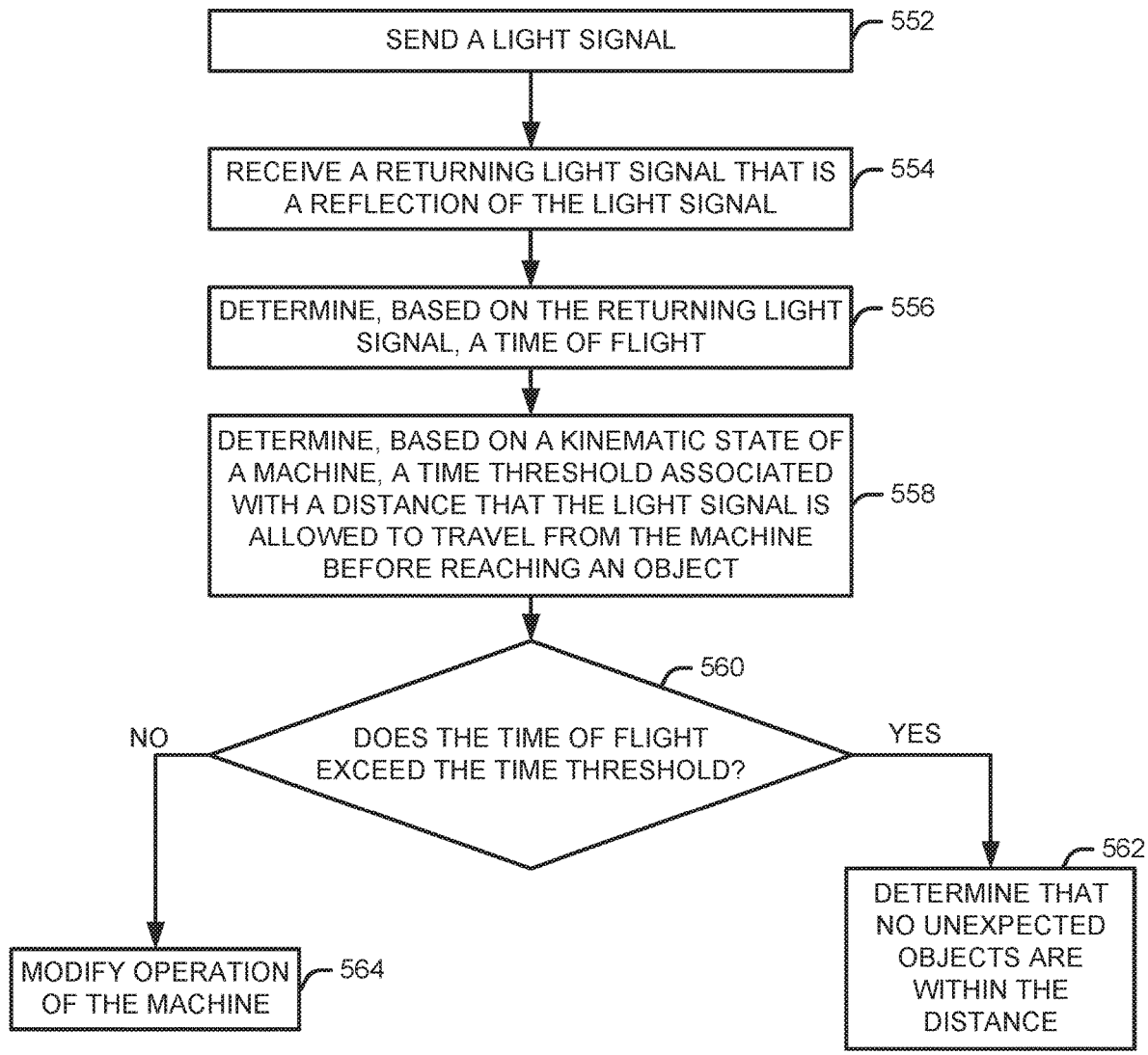
FIG. 5B illustrates a flow diagram for a process for using LIDAR safety rings, in accordance with one or more example embodiments of the present disclosure.

FIG. 5B illustrates a flow diagram for a process 550 for using LIDAR safety rings, in accordance with one or more example embodiments of the present disclosure.

At block 552, a LIDAR device (e.g., the sensor 118 or the sensor 120 of FIG. 1A) may send light signals at different angles of transmission (e.g., a first light signal at a first angle and a second light signal at a second angle different from the first angle). For example, the LIDAR device may emit laser pulses at multiple angles and directions (e.g., signal 212, signal 214 of FIG. 2A). The LIDAR device may include optical signal emitters and LIDAR scanners. The LIDAR device may emit light signals at different angles in the direction of a reflective surface (e.g., the reflective surface 122 or the reflective surface 124 of FIG. 1A), which may reflect the emitted signals in different directions. The reflective surface may surround a machine or robot component to which the LIDAR device is mounted or otherwise operatively connected. The signals emitted or otherwise transmitted by the device may be reflected off of the reflective surface, and may reflect off of people, objects, or surfaces.

At block 554, the LIDAR device may receive returning light signals (e.g., a first returning light signal representative of a reflection of the first light signal off of a person, object, or surface, and a second returning light signal representative of a reflection of the second light signal off of a person, object, or surface). When an emitted signal from the LIDAR device reflects off of a person, object, or surface (e.g., the finger 190 of FIG. 1B), a returning signal is reflected back to the reflective surface, which may reflect the return signals back to the LIDAR device. The signals emitted from the LIDAR device may reflect off of the reflective surface to create a field (e.g., the field 126 or the field 128 of FIG. 1A).

At block 556, the LIDAR device may determine a time of flight based on the returning light signal. The time of flight may be the time from which a light signal is emitted by the LIDAR device to a time when the corresponding returning light signal is received and identified by the LIDAR device. The time of flight may correspond to the distance that the light signal and corresponding returning light signal traveled from the LIDAR device and back to the LIDAR device (e.g., after reaching an object and reflecting back).

At block 558, the LIDAR device may determine, based on a kinematic state (e.g., a movement profile) of a machine, a time threshold associated with a distance threshold (e.g., a distance that the light signal is allowed to travel before reaching an object). The distance threshold (e.g., the distance $D_2$ of FIG. 1B) may represent the distance that a light signal (e.g., the signal 180 of FIG. 1B) may travel before colliding with and reflecting off of an object. Based on the distance threshold, the LIDAR device may determine the time threshold, which may represent the threshold time of flight for the respective light signal. The LIDAR device may determine, based on the angle of the light signal emission or reception, the threshold distance and the corresponding time threshold. Different angles of light signals and/or different kinematic states of a machine may result in different thresholds.

At block 560, the LIDAR device may determine whether the actual time of flight of the returning light signal exceeds the time threshold. When an emitted light signal's returning light signal exceeds the threshold time of flight (e.g., has a time of flight longer than the threshold time of flight), the LIDAR device may proceed to block 562. When an emitted light signal's returning light signal fails to exceed the threshold time of flight (e.g., has a time of flight shorter than the threshold time of flight), the LIDAR device may proceed to block 564. Alternatively, the LIDAR device may determine, based on the time of flight of the light signal, the distance that the light signal traveled (e.g., distance D1 plus distance D3 of FIG. 1B). When the distance is less than a threshold distance for the field (e.g., less than the distance corresponding to the time threshold given the velocity of the light signal), the process 550 may continue to block 564. Otherwise, the process 550 may continue to block 562. The LIDAR device may determine, based on the time of flight of the light signal, the distance that the light signal traveled and the associated distance to the object off of which the light signal reflected (e.g., the distance $D_3$ of FIG. 1B). For example, the LIDAR device may determine, based on the angle of the light signal, the corresponding distance from the LIDAR device to the reflective surface, and therefore the corresponding travel time to and from the reflective surface. Based on the time of flight of the light signal, the LIDAR device may subtract the travel time between the LIDAR device and the reflective surface to determine the travel time and corresponding distance between the reflective surface and the object.

At block 562, when the time of flight exceeds the time of flight threshold or when the distance that the light signal traveled exceeds a distance threshold corresponding to a boundary of a field, the LIDAR device may determine that no unexpected objects are within the distance threshold. As such, the LIDAR device may continue operations. For example, the LIDAR device may allow the machine or robot to continue operations in a current kinematic state (e.g., according to a movement profile) or to adjust operations, but without having to slow down or stop the operation of the machine or robot. When implemented in a security setting, the LIDAR device may avoid sending or presenting any alarms or notifications that a security field corresponding to the threshold distance has been breached.

At block 564, when the time of flight fails to exceed the time of flight threshold or when the distance that the light signal traveled fails to exceed a distance threshold corresponding to a boundary of a field, the LIDAR device may determine that an object is within the field (e.g., within the distance threshold) from the machine or robot. When the LIDAR device determines that an object is within a distance threshold of the machine or robot, the LIDAR device may modify or change operations of the machine or robot. The machine or robot may include multiple components (e.g., component 102, component 110, component 112 of FIG. 1A) moving according to one or more movement profiles which may define velocity, position, rotation, and other movement parameters at any time. The LIDAR device may determine, based on the distance and the kinematic state of the machine or robot, whether the object is a known or expected object that the LIDAR device may be programmed to avoid (e.g., a shelf or wall whose position is programmed into or learned by the LIDAR device). When the object has a position that matches a known set of coordinates that the LIDAR device may associate with an object that is nearby, the LIDAR device may not alter operation of the machine or robot. For example, in a given kinematic state, the LIDAR device may be aware of the position of one component of the robot or machine relative to another component of the robot or machine. Therefore, when the LIDAR device detects an object within the threshold distance, the LIDAR device may recognize, based on the kinematic state, that the object is a component of the robot or machine, and may not alter the operations. However, when the LIDAR device does not determine that a component of the robot or machine should be within the threshold distance for the light signal, the LIDAR device may determine that an unexpected object is too close to the robot or machine, and may modify the machine's operation (e.g., in whole or in part). The LIDAR device may identify a deceleration profile for the robot or machine based on the movement profile of the robot or machine and based on the determined distance to the object. For example, the faster and heavier the robot or machine and the shorter the distance to the object, the faster the deceleration may need to be to avoid collision. The LIDAR device may send signals to other parts of the machine or robot (e.g., one or more processors which may control the motor of the connection point 114 or the connection point 116 of FIG.

1A) indicating the deceleration profile and/or commands to alter the movement of the robot or machine.

Referring to FIG. 5A and FIG. 5B, the devices may be referred to as at least a portion of an apparatus or system (e.g., a robot, machine, vehicle, display, exhibit, etc.). For example, an apparatus or system including the devices of FIG. 5B and FIG. 5B may include at least a portion of the system 100 of FIG. 1A, the system 170 of FIG. 1B, the system 200 of FIG. 2A and FIG. 2B, the system 300 of FIG. 3A, the system 400 of FIG. 4A, and the system 450 of FIG. 4B. Any of the elements described in the above systems may be combined.

Referring to FIGS. 1A-5B, descriptions of a robot or automated machine may refer to a robotic apparatus or an apparatus with one or more automated components.

Figure 6:
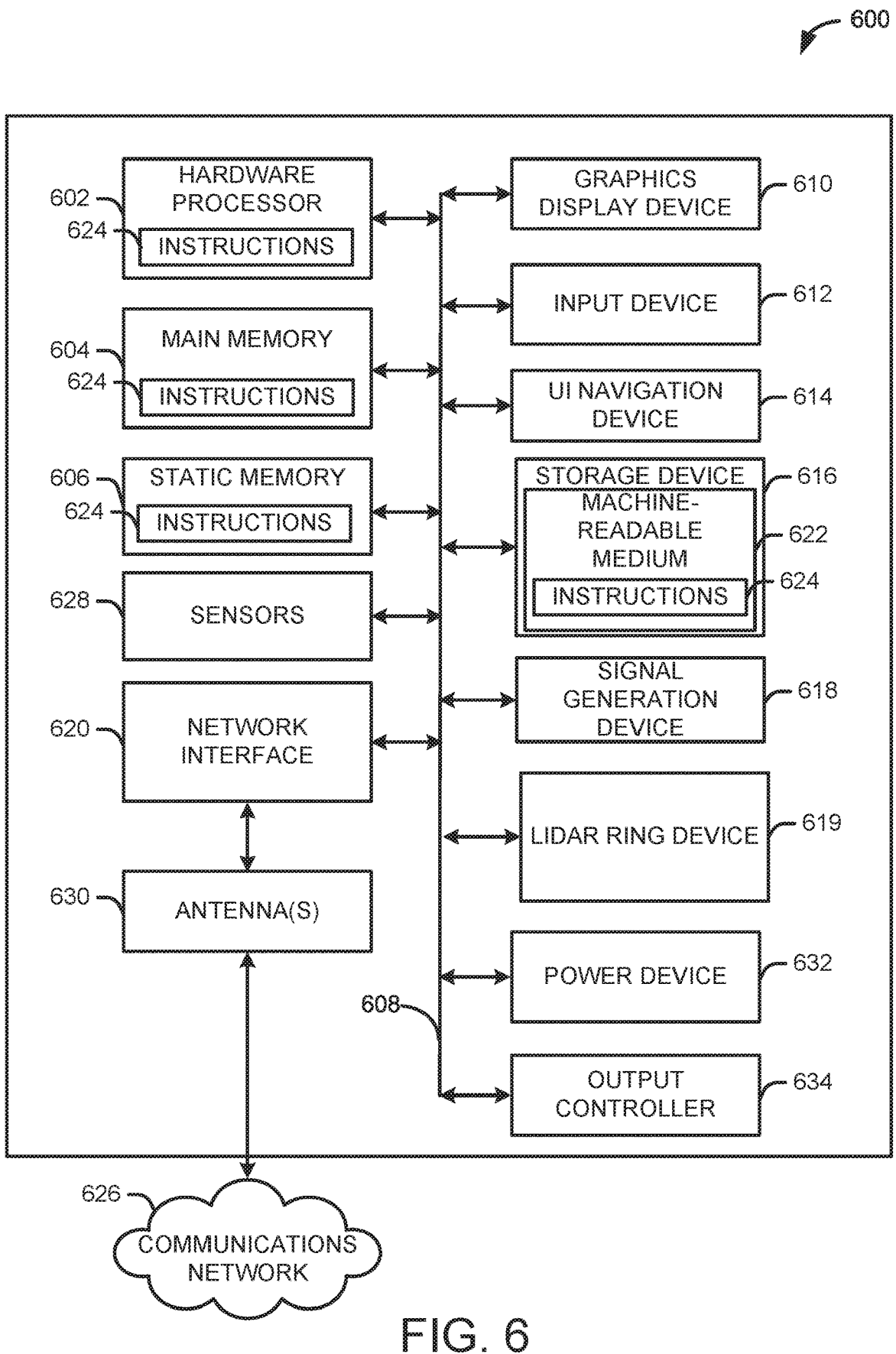
FIG. 6 illustrates a block diagram of an example machine upon which any of one or more techniques (e.g., methods) may be performed, in accordance with one or more example embodiments of the present disclosure.

FIG. 6 illustrates a block diagram of an example of a machine 600 (e.g., implemented in whole or in part by the sensor 118 of FIG. 1A, the sensor 120 of FIG. 1A, the sensor 123 of FIG. 1A, the sensor 176 of FIG. 1B, the sensor 204 of FIG. 2A and FIG. 2B, the sensor 206 of FIG. 2A and FIG. 2B, the sensor 314 of FIG. 3A, the sensor 404 and the sensor 406 of FIG. 4A, and the sensor 454, the sensor 456, the sensor 458, and the sensor 461 of FIG. 4B) or system upon which any one or more of the techniques (e.g., methodologies) discussed herein may be performed. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in Wi-Fi direct, peer-to-peer (P2P) (or other distributed) network environments. The machine 600 may be a LIDAR sensor or other type of LIDAR device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include any combination of the illustrated components. For example, the machine 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a LIDAR laser emitter or other type of light/optical signal emitter), a LIDAR ring device 619, a network interface device/transceiver 620 coupled to antenna(s) 630, and one or more sensors 628, such as a LIDAR sensor or other type of laser sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The LIDAR ring device 619 may carry out or perform any of the operations and processes (e.g., process 500 of FIG. 5A, process 550 of FIG. 5B) described and shown above.

In one or more embodiments, the LIDAR ring device 619 may be implemented as a LIDAR sensor device (e.g., the sensor 118 of FIG. 1A, the sensor 120 of FIG. 1A, the sensor 123 of FIG. 1A, the sensor 176 of FIG. 1B, the sensor 204 of FIG. 2A and FIG. 2B, the sensor 206 of FIG. 2A and FIG. 2B, the sensor 314 of FIG. 3A, the sensor 406 of FIG. 4) or as another device in communication with a LIDAR sensor device and capable of performing at least a portion of the operations and processes described at least in process 500 of FIG. 5A and process 550 of FIG. 5B.

In one or more embodiments, the LIDAR ring device 619 may be used to generate a field (e.g., the field 126 of FIG. 1A, the field 128 of FIG. 1A, the field 130 of FIG. 1A, the field 240 of FIG. 2B) around at least a portion of a robot or machine and to detect when any objects or surfaces breach the boundaries of field (e.g., are within a threshold distance corresponding to a boundary of the field). When an object or surface comes within the field (e.g., the distance $D_2$ of FIG. 1B), the robot or machine may change or stop operations (e.g., according to a deceleration profile). The field may consist of LIDAR safety rings around components of a robot. For example, the force field around a robot arm may be cylindrical in nature (e.g., a series of LIDAR rings representing cross-sections of the force field). By generating a number of LIDAR safety rings, a LIDAR system may generate a force field around a robot, and may use LIDAR to detect when an object or surface is within the force field (e.g., is too close to the robot to ensure operational safety). Because the force field may be created using LIDAR light signals, a robot may be able to operate at higher speeds than robots which rely on force (e.g., touch) detection for object or surface proximity.

In one or more embodiments, to create LIDAR safety rings, the LIDAR ring device 619 may emit or otherwise transmit signals (or may cause the one or more sensors 628 to emit or otherwise transmit signals), such as optical signals in outward directions from a robot or machine. Reflective surfaces, such as mirrors, may be arranged around the robot (entirely or in part) to reflect the outwardly transmitted signals from the sensors. For example, a reflective surface may form a ring around all or a portion of a robot. The reflective surface may be concave or otherwise shaped to reflect signals sent from the sensors at different angles to create a surrounding force field or zone around at least a portion of the robot. For example, a reflective surface in a toroidal shape attached to or otherwise arranged around the robot may reflect the signals transmitted at different angles in a manner that creates a field or zone around the machine. The field may take a shape dependent on the shape and arrangement of the reflective surface relative to the machine and/or sensors. For example, the field may be elliptical, cylindrical, conical, polygonal, or another shape which at least partially engulfs all or a portion of the robot. The field may represent a series of LIDAR rings (or other shapes surrounding the robot) which, when crossed by an object or person, may result in an operational change of the robot in order to avoid a collision.

In one or more embodiments, any portion of a robot may use at least a portion of the machine 600 and one or more reflective surfaces to create a field or zone using LIDAR. For example, if a robot has multiple moveable components (e.g., moveable arms), any of the arms may attach to or otherwise be arranged relative to the LIDAR ring device 619 which may transmit and receive signals (or may cause the one or more sensors 628 to transmit and scan for return signals), such as optical light signals. The one or more sensors 628 may include transceivers or may be ranging sensors, and may share the characteristics described above with regard to the sensor 118, the sensor 120, and the sensor 123 of FIG. 1A, the sensor 176 and the sensor 178 of FIG. 1B, the sensor 204 and the sensor 206 of FIG. 2A and FIG. 2B, the sensor 314 of FIG. 3A, the sensor 404 and the sensor 406 of FIG. 4A, and the sensor 454, the sensor 456, the sensor 458, and the sensor 460 of FIG. 4B.

In one or more embodiments, the LIDAR ring device 619 used to transmit light signals for the creation of a field or zone around a robot may be configured to transmit the light signals at different angles (or to cause the one or more sensors 628 to transmit the light signals at different angles). The LIDAR ring device 619 may be arranged at or near a connecting joint of two or more components of a robot, device, machine, display, or vehicle (e.g., the connection point 114 or the connection point 116 of FIG. 1A). In this manner, one light signal may reflect off of a reflective light surface at a different location and angle than another light signal transmitted at a different angle. When the respective light signals reflect off of an object or person, the light signals may reflect back to the reflective surface, and from the reflective surface back to the LIDAR ring device 619 (or to the one or more sensors 628).

In one or more embodiments, the LIDAR ring device 619 may use the returning light signal (e.g., the light signal reflected back to the machine 600 after being transmitted toward the reflective surface from the LIDAR ring device 619 or the one or more sensors 628) to determine the distance from which the returning light signal was reflected (e.g., a distance to an object, surface, or person from which the light signal was reflected). Given the angle at which a respective light signal is transmitted, the LIDAR ring device 619 may determine a distance between the LIDAR ring device 619 and the reflective surface, and a distance threshold for any respectively transmitted light signal. Based on the distances and the known velocity of light signals, the LIDAR ring device 619 may determine the corresponding time of flight threshold for the light signal. For example, a transmission of a light signal at one angle may result in a different distance threshold than the distance threshold for a light signal transmitted at a different angle. The respective distance thresholds may correspond to the field or zone around the robot or other item or machine. The LIDAR ring device 619 may transmit and scan over a range of angles (or may cause the one or more sensors 628 to transmit and scan), and may determine a distance threshold at each angle at which a light signal is transmitted.

In one or more embodiments, the LIDAR ring device 619 may determine, for any respectively transmitted light signal, whether the corresponding returning light signal indicates that an object, surface, or person is within the corresponding distance threshold for the light signal given the angle at which the light signal was transmitted. The LIDAR ring device 619 may determine the time of flight of a light signal based on the time of emission and the time of reception of the returning light signal. When the time of flight fails to meet or exceed a time of flight threshold corresponding to the distance threshold, the LIDAR ring device 619 may determine that an object, surface, or person is within the threshold distance. When the returning light signal indicates that an object, surface, or person is at a distance within the threshold distance, the LIDAR ring device 619 may determine that the object, surface, or person is within the field or zone around the robot (e.g., is too proximal), and may alter the robot's operation (e.g., by slowing down or stopping all or a portion of the robot's movement). Based on a robot's or other machine's or item's operational speed or force (e.g., as defined by a movement profile), and based on the LIDAR-determined distance to an object, surface, or person, the LIDAR ring device 619 may determine a time or rate at which to slow down or stop in order to avoid a collision with the object, surface, or person. When the returning light signal indicates that an object, surface, or person is at a distance exceeding the corresponding distance threshold, the LIDAR ring device 619 may determine that there are no objects, surfaces, or people proximal enough to pose an operational safety risk, and the robot, machine, or other item may continue its operations.

In one or more embodiments, the LIDAR ring device 619 may use deceleration profiles to determine when to slow down movement and at what rates and times. For example, given a LIDAR-detected distance between the robot and a person, object, or surface, the robot may identify a deceleration profile based on the kinematic state of the robot, machine, or other item. For example, given the type or speed of movement of the robot, machine, or other item and the distance to a person, object, or surface, the LIDAR ring device 619 may select a deceleration profile which may govern the rate at which the robot, machine, or other time may decelerate given the amount of time the robot has before colliding with or coming within a threshold distance of the person, object, or surface.

It is understood that the above are only a subset of what the LIDAR ring device 619 may be configured to perform and that other functions included throughout this disclosure may also be performed by the LIDAR ring device 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, LIDAR systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, LIDAR, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. An apparatus, comprising:
    a first moveable component having a first longitudinal central axis spanning between a first end and a second end, and the first moveable component configured to move automatically at a first movement rate;
    a second moveable component having a second longitudinal central axis spanning between a third end and a fourth end, and the second moveable component configured to move at a second movement rate;
    a first reflective surface mounted to the first moveable component, wherein the first reflective surface is configured to reflect first light signals toward the second end, and to reflect first returning light signals toward the first end, wherein the first returning light signals comprise first reflections of the first light signals from a first object, and wherein the first reflections of the first light signals toward the second end define a first zone at least partially around the first moveable component;
    a second reflective surface mounted to the second moveable component, wherein the second reflective surface is configured to reflect second light signals toward the fourth end, and to reflect second returning light signals toward the third end, wherein the second returning light signals comprise second reflections of the second light signals from a second object, and wherein the second reflections of the second light signals toward the fourth end define a second zone at least partially around the second moveable component;
    one or more first Light Detection and Ranging (LIDAR) devices configured to emit the first light signals and to receive the first returning light signals;
    one or more second LIDAR devices configured to emit the second light signals and to receive the second returning light signals; and
    at least one processor, the at least one processor configured to:
        determine, based on the first light signals and the first returning light signals, a first time of flight;
        determine, based on the second light signals and the second returning light signals, a second time of flight;
        determine that the first time of flight exceeds a first threshold time;
        determine that the second time of flight fails to exceed a second threshold time;
        determine, based on the first time of flight, that the first object is outside of the first zone;
        determine, based on the second time of flight, that the second object is within the second zone; and
        cause at least one of the first moveable component to modify the first movement rate or the second moveable component to modify the second movement rate.

2. The apparatus of claim 1, wherein the at least one processor is further configured to:
    determine, based on a first kinematic state of the first moveable component, a first threshold distance associated with the first zone;
    determine, based on a second kinematic state of the second moveable component, a second threshold distance associated with the second zone;
    determine, based on the first threshold distance, the first threshold time; and
    determine, based on the second threshold distance, the second threshold time.

3. The apparatus of claim 1, wherein the one or more first LIDAR devices is further configured to emit a first signal of the first light signals at a first angle, wherein the one or more second LIDAR devices is further configured to emit a second signal of the second light signals at a second angle, and wherein the at least one processor is further configured to:
    determine, based on the first angle, a first distance between the one or more first LIDAR devices and the first reflective surface;
    determine, based on the first distance, a first threshold distance associated with the first zone;
    determine, based on the second angle, a second distance between the one or more second LIDAR devices and the second reflective surface;
    determine, based on the second distance, a second threshold distance associated with the second zone;
    determine, based on the first threshold distance, the first threshold time; and
    determine, based on the second threshold distance, the second threshold time.

4. The apparatus of claim 3, wherein the at least one processor is further configured to determine, based on a kinematic state of the first moveable component, a third distance between the first reflective surface and the second moveable component, wherein to determine the first threshold distance is further based on the third distance.

5. A robotic apparatus, comprising:
    a moveable component having a longitudinal central axis spanning between a first end and a second end;

a transceiver positioned at the first end of the moveable component and configured to emit and receive light;

a reflective surface at the first end of the moveable component, wherein the reflective surface is configured to reflect light signals emitted by the transceiver toward the second end, and to reflect returning light signals toward the transceiver; and at least one processor, the at least one processor configured to:

determine, based on the returning light signals, that an object is within a distance of the moveable component; and change an operation of the robotic apparatus based on the object.

6. The robotic apparatus of claim 5, wherein to determine that the object is within the distance comprises to:

determine, based on the distance, a threshold time;

determine, based on the light signals and the returning light signals, a time of flight; and determine that the time of flight fails to exceed the threshold time.

7. The robotic apparatus of claim 6, wherein the at least one processor is further configured to determine a kinematic state of the moveable component, and wherein to determine the distance is based on the kinematic state.

8. The robotic apparatus of claim 5, wherein the transceiver is further configured to emit a first signal of the light signals at an angle, and wherein to determine that the object is within the distance is based on the angle.

9. The robotic apparatus of claim 8, wherein the distance is a first distance, wherein to determine that the object is within the first distance comprises to:

determine, based on the angle, a second distance between the transceiver and the reflective surface;

determine, based on the first distance and the second distance, a threshold time;

determine, based on the light signals and the returning light signals, a time of flight; and determine that the time of flight fails to exceed the threshold time.

10. The robotic apparatus of claim 5, wherein the moveable component is a first moveable component, wherein the apparatus comprises a second moveable component, wherein the distance is between the first moveable component and the second moveable component, and wherein the at least one processor is further configured to:

determine a kinematic state of the first moveable component; and determine, based on the kinematic state, the distance.

11. The robotic apparatus of claim 5, wherein the reflective surface is a first reflective surface positioned in a first orientation, wherein the light signals are first light signals, wherein the returning light signals are first returning light signals, wherein the distance is a first distance, and wherein the transceiver is a first transceiver, further comprising:

a second transceiver positioned at the first end of the moveable component and configured to emit and receive light; and a second reflective surface at the first end of the moveable component positioned in a second orientation, wherein the second reflective surface is configured to reflect second light signals emitted by the second transceiver toward the second end, and to reflect second returning light signals toward the second transceiver, wherein the at least one processor is further configured to determine, based on the second returning light signals, that the object is within a second distance of the moveable component.

12. The robotic apparatus of claim 5, wherein the moveable component is a first moveable component, wherein the reflective surface is a first reflective surface, wherein the light signals are first light signals, wherein the returning light signals are first returning light signals, wherein the object is a first object, and wherein the transceiver is a first transceiver device, further comprising:

a second moveable component having a longitudinal central axis spanning between a third end and a fourth end;

a second transceiver positioned at the third end of the second moveable component and configured to emit and receive light; and a second reflective surface at the third end of the second moveable component, wherein the second reflective surface is configured to reflect second light signals emitted by the second transceiver toward the fourth end, and to reflect second returning light signals toward the second transceiver.

13. The robotic apparatus of claim 12, wherein the first light signals form a first zone around at least a portion of the first moveable component, wherein the second light signals form a second zone around at least a portion of the second moveable component, and wherein first zone and the second zone are the same shape.

14. The robotic apparatus of claim 12, wherein the first light signals form a first zone around at least a portion of the first moveable component, wherein the second light signals form a second zone around at least a portion of the second moveable component, wherein the first zone is a first shape, wherein the second zone is a second shape, and wherein the first shape is different from the second shape.

15. The robotic apparatus of claim 12, wherein the distance is a first distance, and wherein the at least one processor is further configured to:

determine a second distance from the second moveable component;

determine, based on the first distance, a first threshold time;

determine, based on the second distance, a second threshold time;

determine, based on the first light signals and the first returning light signals, a first time of flight;

determine, based on the second light signals and the second returning light signals, a second time of flight;

determine that the first time of flight fails to exceed the first threshold time; and determine that the second time of flight exceeds the second threshold time.

16. The robotic apparatus of claim 5, wherein the at least one processor is further configured to:

determine a kinematic state associated with the moveable component; and determine, based on the kinematic state, a deceleration profile, wherein to change the operation of the robotic apparatus is further based on the deceleration profile.

17. A method, comprising:

receiving, by a transceiver of a robotic apparatus, the robotic apparatus having a moveable component having a longitudinal central axis spanning between a first end and a second end, from a reflective surface at the first end of the moveable component, one or more returning light signals, wherein the one or more returning light signals comprise reflections of light signals from an object, wherein the one or more returning light signals are based on the light signals being reflected toward the second end by the reflective surface toward the object;

determining, by at least one processor, based on the one or more returning light signals, that the object is within a distance of the robotic apparatus; and change, by the at least one processor, an operation of the robotic apparatus based on the object.

18. The method of claim 17, wherein determining that the object is within the distance comprises:

determining, based on the distance, a threshold time;

determining, based on the light signals and the returning light signals, a time of flight; and determining that the time of flight fails to exceed the threshold time.

19. The method of claim 18, further comprising determining a kinematic state of the robotic apparatus, and wherein determining the distance is based on the kinematic state.

20. The method of claim 17, wherein the reflective surface is a first reflective surface positioned in a first orientation, wherein the light signals are first light signals, wherein the one or more returning light signals are first returning light signals, and wherein the distance is a first distance, further comprising:

receiving, from a second reflective surface of the robotic apparatus, one or more second returning light signals, wherein the one or more second returning light signals comprise reflections of second light signals from the object, wherein the one or more second returning light signals are based on the second light signals being reflected by the second reflective surface toward the object;

determine, based on the one or more second returning light signals, that the object is within a second distance of the robotic apparatus.

* * * * *